United States Patent
Sopko et al.

(12) 
(10) Patent No.: US 6,436,541 B1
(45) Date of Patent: Aug. 20, 2002

(54) CONDUCTIVE ANTIREFLECTIVE COATINGS AND METHODS OF PRODUCING SAME

(75) Inventors: John F. Sopko, Trafford; Michael O. Okoroafor, Export; Huawen Li, Delmont, all of PA (US); George A. Neuman, Duluth, GA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/287,305

(22) Filed: Apr. 7, 1999

Related U.S. Application Data
(60) Provisional application No. 60/080,972, filed on Apr. 7, 1998.

(51) Int. Cl.⁷ .................................................. B32B 9/00
(52) U.S. Cl. ........................ 428/432; 428/212; 428/216; 428/336; 428/701; 428/702; 428/699; 359/585; 359/586; 359/359
(58) Field of Search ................................. 428/427, 216, 428/336, 428, 432, 701, 702, 212; 359/359, 361, 585, 586, 589, 580

(56) References Cited

U.S. PATENT DOCUMENTS

| | | | |
|---|---|---|---|
| 2,331,716 A | 10/1943 | Nadean et al. | |
| 2,617,745 A | 11/1952 | Raymond et al. | |
| 3,432,225 A | 3/1969 | Rock | |
| 3,960,441 A | 6/1976 | Kamiya et al. | |
| 4,372,987 A | 2/1983 | Ganner et al. | |

(List continued on next page.)

FOREIGN PATENT DOCUMENTS

| | | |
|---|---|---|
| DE | 3543178 | 6/1987 |
| DE | 004117256 A1 * | 12/1992 |
| EP | 0119331 A1 * | 9/1984 |
| EP | 0 533 030 | 3/1993 |
| EP | 0 568 702 | 11/1993 |
| EP | 0 708 063 | 4/1996 |
| EP | 0 728 712 | 8/1996 |
| EP | 0 791 562 | 8/1997 |
| EP | 0 798 272 | 10/1997 |
| JP | 6-103928 | 4/1994 |
| WO | 90/14317 | 11/1990 |
| WO | 97/03029 | 1/1997 |
| WO | 97/008357 * | 3/1997 |

OTHER PUBLICATIONS

Metin, Serhat et al., "Amorphous carbon antireflective coatings in the 10 to 50 $\mu$m region of the far–IR", *J. Mater. Res.*, vol. 9, No. 2, Feb. 1994, pp. 396–400.

Wolfe, J., "Anti–Static Anti–Reflection Coatings Using Various Metal Layers", 38th Annual Technical Conference Proceedings of the Society of Vacuum Coaters, Apr. 2–7, 1995, pp. 272–275.

Cojocaru, E., "Simple relations and diagrams for antireflection thin–film coatings on absorbing substrates at oblique incidence", *Optica Applicata*, vol. XXV, No. 3, 1995, pp. 233–238 No Month.

Jiang, S. J. et al., "Low–refractive–index indium–tin–oxy-fluoride thin films made by high–rate reactive dc magnetron sputtering", *Applied Optics*, vol. 27, No. 14, Jul. 15, 1988, pp. 2847–2850.

(List continued on next page.)

*Primary Examiner*—Deborah Jones
*Assistant Examiner*—Jennifer McNeil
(74) *Attorney, Agent, or Firm*—Donald C. Lepiane

(57) ABSTRACT

This invention relates to a two layers or more anti-static film coating deposited on a substrate. Selected layers of the films may have anti-static and/or electromagnetic properties. In one embodiment, the film farthest from the substrate has an index of refraction lower than the underlying film. In another embodiment, the surface of the film is roughened to provide a graded index of refraction.

24 Claims, 5 Drawing Sheets

U.S. PATENT DOCUMENTS

| | | | |
|---|---|---|---|
| 4,446,171 A | | 5/1984 | Thomas |
| 4,578,527 A | | 3/1986 | Rancourt et al. |
| 4,583,822 A | | 4/1986 | Southwell |
| 4,590,117 A | * | 5/1986 | Taniguchi et al. |
| 4,632,527 A | | 12/1986 | Masso et al. |
| 4,693,910 A | | 9/1987 | Nakajima et al. |
| 4,747,674 A | | 5/1988 | Butterfield et al. |
| 4,853,257 A | | 8/1989 | Henery |
| 4,919,778 A | | 4/1990 | Dietrick et al. |
| 4,944,986 A | | 7/1990 | Zuel |
| 5,007,708 A | | 4/1991 | Gaylord et al. |
| 5,106,671 A | | 4/1992 | Amberger et al. |
| 5,170,291 A | | 12/1992 | Szczyrbowski et al. |
| 5,171,414 A | | 12/1992 | Amberger et al. |
| 5,194,990 A | | 3/1993 | Boulos et al. |
| 5,208,101 A | | 5/1993 | Boulos et al. |
| 5,234,748 A | | 8/1993 | Demiryont et al. |
| 5,245,468 A | | 9/1993 | Demiryont et al. |
| 5,250,098 A | | 10/1993 | Platts |
| 5,270,858 A | * | 12/1993 | Dickey |
| 5,318,830 A | | 6/1994 | Takamatsu et al. |
| 5,362,552 A | * | 11/1994 | Austin |
| 5,382,383 A | | 1/1995 | Hirai et al. |
| 5,404,073 A | | 4/1995 | Tong et al. |
| 5,407,733 A | * | 4/1995 | Bjornard et al. |
| 5,427,818 A | | 6/1995 | Tong et al. |
| 5,450,238 A | | 9/1995 | Bjornard et al. |
| 5,476,717 A | | 12/1995 | Floch |
| 5,494,743 A | | 2/1996 | Woodard et al. |
| 5,523,649 A | | 6/1996 | Tong et al. |
| 5,536,580 A | | 7/1996 | Ikadai et al. |
| 5,539,275 A | | 7/1996 | Arimoto et al. |
| 5,550,429 A | | 8/1996 | Hayama et al. |
| 5,557,466 A | | 9/1996 | Otani et al. |
| 5,572,086 A | | 11/1996 | Tong et al. |
| 5,579,162 A | | 11/1996 | Bjornard et al. |
| 5,580,662 A | | 12/1996 | Tong et al. |
| 5,580,819 A | * | 12/1996 | Li et al. |
| 5,582,859 A | | 12/1996 | Tong et al. |
| 5,582,919 A | | 12/1996 | Ikadai et al. |
| 5,585,186 A | | 12/1996 | Scholz et al. |
| 5,631,065 A | * | 5/1997 | Gordon |
| 5,652,476 A | | 7/1997 | Matsuda et al. |
| 5,667,880 A | | 9/1997 | Okaniwa |
| 5,681,885 A | | 10/1997 | Kinoshita et al. |
| 5,691,044 A | | 11/1997 | Oyama et al. |
| 5,698,258 A | | 12/1997 | Takizawa et al. |
| 5,712,024 A | | 1/1998 | Okuzaki et al. |
| 5,719,705 A | | 2/1998 | Machol |
| 5,725,959 A | | 3/1998 | Terada et al. |
| 5,728,456 A | * | 3/1998 | Adair et al. |
| 5,729,323 A | | 3/1998 | Arden et al. |
| 5,733,660 A | | 3/1998 | Makita et al. |
| 5,744,215 A | * | 4/1998 | Neuman |
| 5,756,192 A | * | 5/1998 | Crawley et al. |
| 5,764,416 A | | 6/1998 | Rahn |
| 5,811,191 A | * | 9/1998 | Neuman |
| 5,830,252 A | | 11/1998 | Finley et al. |
| 5,891,556 A | | 4/1999 | Anderson et al. |
| 5,925,438 A | * | 7/1999 | Ota et al. |
| 5,952,084 A | | 9/1999 | Anderson et al. |
| 6,124,026 A | * | 9/2000 | McCurdy et al. |

OTHER PUBLICATIONS

Narula, C. K. et al., "Atmospheric Pressure Chemical Vapor Deposition of $SiO_2$–$TiO_2$ Antireflective Films from [Tri–(t-ert–butoxy)siloxy–tri–(tert–butoxy)]titanium, $[C_4H_9O]_3Si$–O–$Ti[OC_4H_9]_3$, which is a Single Source Alkoxide Precursor", *Chem. Vap. Deposition*, 1996, 2, No. 1, pp. 13–15 No Month.

Manasson, V. A. et al., Antireflection properties of conducting films near the plasma resonance frequency, *Opt. Spectrosc.* (*USSR*) 59(5), Nov. 1985, pp. 687–688.

Tong, H. et al., Á Review of the Current Status of CRT Technologies, *SPIE*, vol. 2643, pp. 10–19 No Date.

Strong, J., "Practical Applications of High and Low–Reflecting Films on Glass", *Le Journal De Physique et le Radium*, Tome 11, Juillet 1950, pp. 441–443 No Month.

Dobrowolski, J. A. et al., "High performance step–down AR coatings for high refractive–index IR materials", *Applied Optics*, vol. 21, No. 2, Jan. 15, 1982, pp. 288–292.

Ganner, P., "Medium–Index Mixed–Oxide Layers for Use in AR–Coatings", *SPIE*, vol. 652 Thin Film Technologies II (1986), pp. 69–76 No Month.

Aguilera, J. A. et al., "Antireflection coatings for germanium IR optics: a comparison of numerical design methods", *Applied Optics*, vol. 27, No. 14, Jul. 15, 1988, pp. 2832–2840.

Tikhonravov, A. V. et al., "Quasi–optimal synthesis for antireflection coatings: a new method", *Applied Optics*, vol. 32, No. 22, Aug. 1, 1993, pp. 4265–4274.

Willey, R. R., "Predicting achievable design performance of broadband antireflection coatings" *Applied Optics*, vol. 32, No. 28, Oct. 1, 1993, pp. 5447–5451.

Chiao, S. C. et al., "Optimized design of an antireflection coating for textured silicon solar cells", *Applied Optics*, vol. 32, No. 28, Oct. 1, 1993, pp. 5557–5560.

Baumeister, P. et al., "Application of linear programming to antireflection coating design", *J. Opt. Soc. Am.*, vol. 67, No. 8, Aug. 1977, pp. 1039–1045.

Yoldas, B. E. et al., "Wide spectrum antireflective coating for fused silica and other glasses", *Applied Optcis*, vol. 23, No. 9, May 1, 1984.

Debsikdar, J. C., "Deposition of Gradient–Index Antireflective Coating: An Approach Based on Ultrastructure Processing", *Journal of Non–Crystalline Solids* 91 (1987) pp. 262–270 No Month.

Muscalu, G. L. et al., "Effect of dispersion on the spectral characteristics of multilayer thin films", *Optica Applicata*, vol. XIV, No. 4, 1984, pp. 501–508 No Month.

Piegari, A. et al., "Wideband antireflection coating design by the random search approach", *SPIE*, vol. 652 Thin Film Technologies II (1986), pp. 64–68 No Month.

Pettit, R. B. et al., "Sol–Gel Double–Layer Antireflection Coatings for Silicon Solar Cells", *Solar Cells*, 15 (1985) pp. 267–278 No Month.

Lucas, I. et al., "Modelisation optique des couches minces", *Rivista della Staz. Sper. Vetron 6*, 1986, pp. 115–118 (with translation) No Month.

Hass, G. et al., "Optical Film Materials and Thier Applications", *Journal of Vacuum Science and Technology*, vol. 4, No. 2, pp. 71–79 No Date.

Nagendra, C. L. et al., "Three–layer antireflection coatings: a new method for design and optimization", *Applied Optics*, vol. 22, No. 24, Dec. 15, 1983, pp. 4118–4126.

Prasad, A. et al., "Porous Silicon Oxide Anti–Reflection Coating for Solar Cells", *J. Electrom. Soc. Solid State Science and Technology*, Mar. 1992. pp. 596–599.

Reichelt, W., "Fortschritte in der Herstellung von Oxydschichten fur optische und elektrische Zwecke", pp. 25–29 No Date.

Behrndt, K. H. et al. "Fabrication of Multilayer Dielectric Films", *The Journal of Vacuum Science and Technology*, vol. 3, No. 5, pp. 264–272 No Date.

Nagendra, C. L. et al., "Multilayer antireflection coatings (ARCs): A versatile method for design and optimization", *SPIE Int. Soc. Opt. Eng.*, Jun. 14, 1984, pp. 147–154.

Young, K. K. et al., "Preparation and Characterization of 100ø Oxide/Nitride/Oxide Stacked Films", *Electrochem. Soc.*, vol. 87–10, Mar. 7, 1988, pp. 471–480.

Nadeau, G. F. et al., Canadian Patent Application No. 418289, Feb. 8, 1944, *Non–Reflecting Coatings*.

* cited by examiner

CONDUCTIVE ANTIREFLECTIVE COATINGS AND METHODS OF PRODUCING SAME

CROSS REFERENCE TO RELATED APPLICATION

This application claims priority to U.S. Provisional Application Serial No. 60/080,972, filed Apr. 7, 1998.

BACKGROUND OF THE INVENTION

1. Field of the Invention

This invention relates to multilayered antireflective coatings, articles having such coatings, and methods for making same.

2. Description of the Technology

It is known that a surface will reflect light and that the amount of light reflected from the surface will increase as the viewing angle increases. The reflected light from the surface of a substrate may be objectionable when an observer is viewing a transmitted image through the substrate, e.g., a cathode ray-tube (hereafter "CRT"), architectural glazing, a glass covering a picture, or the lens of an optical instrument or eyeglasses. The reflected light is objectionable because it obscures the transmitted image, and the transmitted image may become indiscernible if the reflected light is too intense. Viewing an image that is obscured by reflected light may cause eye strain for the observer. Further, the reflectance light may be objectionable for aesthetic reasons, as for example in the case of architectural glazing and eyeglasses.

One technique to reduce reflectance is to roughen the surface of the substrate to provide a rough anti-glare surface or to deposit an anti-glare coating over the surface of the substrate. In this manner, reflected light is scattered and appears blurred and less intense to the observer. One limitation with these approaches is that the transmitted image is also blurred due to the roughened surface or anti-glare coating.

Another technique to reduce reflection is the use of an antireflective coating. As used herein the term "antireflective coating" refers to a multilayered coating that has destructive interference of light waves traveling through the coating to reduce the intensity of the reflected light. An advantage of anti-reflection coatings is the contrast of the transmitted image is improved over the image transmitted through a substrate having a rough surface or an anti-glare coating.

Certain surfaces are subject to a build up of static charges which attracts dust and/or dirt to the surface. viewing a transmitted image through a dusty and/or dirty surface blurs the transmitted image and increases the intensity of the reflected light further reducing viewing of the transmitted image. It has been found that the build up of static charge can be eliminated by grounding an anti-static coating that has a resistivity of less than about $10^8$ ohm/square to dissipate the electric charging. One limitation of anti-static coatings is that they may increase the reflectance of light due to differences in the refractive index between the substrate and the anti-static coating.

Manufacturers of CRTs have combined the anti-glare and anti-static technologies to provide products having anti-glare, anti-static (AGAS) coated surfaces (U.S. Pat. No. 5,427,818 and 5,404,073). A drawback of products having AGAS surfaces is transmitted image degradation due to light scattering from the anti-glare portion of the coating.

The degradation of the transmitted image in anti-glare and AGAS technology may be circumvented by using an anti-reflection portion for example of the type disclosed in European Patent Application 0 533 030 A2 or replacing the anti-glare portion of the AGAS coating with an anti-reflection portion for example as discussed in Japanese Kokai Patent Application No. HEI 6[1994]-103928.

As may be appreciated by those skilled in the art, there is a need for an antireflective coating that does not have the drawbacks and limitation of the presently available coatings.

SUMMARY OF THE INVENTION

The present invention relates to multilayer coatings that reduce the percent of reflectance from a surface. In one embodiment of the invention, a multilayered antireflective coating includes at least one transparent conductive oxide layer (hereafter "TCO layer") deposited over a substrate and at least one layer having an index of refraction lower than the index of refraction of the TCO layer deposited over the TCO layer.

In an embodiment of the invention, the TOC layer has a sufficient thickness to have a sheet resistivity less than about 1000 ohms/square to provide the TCO layer with anti-static and electromagnetic shielding properties. The TCO layer may be of indium tin oxide, fluorine-doped zinc oxide, zinc stannate, antimony-doped tin oxide or fluorine-doped tin oxide.

Further, the invention relates to multilayered antireflective coating having at least one layer deposited over a surface of a substrates. The at least one layer has an optical thickness approximately equal to one-third of the wavelength of the light energy whose reflection is to be suppressed ("selected wavelength"), and a layer over the at least one layer having an optical thickness approximately equal to one-fifth of the above selected wavelength.

The layer farthest from the substrate (the layer having a low refractive index) preferably has a bulk refractive index less than about 1.65. The refractive index of the low refractive index layer may be homogeneous throughout its thickness or may be varied as a function of layer thickness.

The invention still further relates to an antireflective coating for substrates having a range of index of refraction at its an anti-reflection coating that reduces the reflectance of a low index (e.g., 1.4 to 1.7) surface, e.g., glass or plastic, by 75% to 90%. The antireflective coating includes a first layer having refractive index of about 1.7 to 2.2 and an optical thickness of about ⅓ a selected wavelength, and a second layer deposited over the first layer having an index of refraction that is lower than that of the first layer and an optical thickness less than about ⅓ the selected wavelength. The second layer may have a refractive index that is homogeneous or a refractive index that is graded or non-homogeneous. The first layer may be a TCO layer to provide anti-static and/or electromagnetic shielding properties.

In another embodiment of the invention an at least 4-layer anti-reflection coating to reduce the reflectance of the substrate is deposited on a low index substrate, e.g., glass or plastic, in a broad-band manner in the visible electromagnetic spectrum. A first layer deposited over a surface of the substrate has a refractive index that is higher than the index of refraction of the substrate. A second layer having a refractive index lower than the first layer is deposited over the first layer. A third layer having a thickness greater than 5 Å has a refractive index in the range of 1.7 to 2.2 is deposited over the second layer; the third layer may be electrically conductive. The fourth layer deposited over the third layer has a refractive index lower than the index of refraction of the third layer.

In yet another embodiment of the invention an antireflection coating deposited over a substrate includes moderately light absorbing materials as part of a multi-layer coating to improve the contrast of a transmitted image viewed through the substrate. "Moderately light absorbing" is defined by the imaginary refractive index being in the range of 0.05–0.8. The visible light transmission through the coating can be reduced by the use of moderately absorbing materials.

DESCRIPTION OF PREFERRED EMBODIMENTS OF THE INVENTION
BACKGROUND DISCUSSION

The human eye does not perceive all visible wavelengths of light equally. The eye is most sensitive to the wavelength range for green color of the visible spectrum and less sensitive to the violet or red colors, i.e., the green color or light will appear brighter than red or violet color for light for the same absolute intensity value. A weighting function giving numerical values to the eye sensitivity was established by Commission Internationale de l'Eclairage to convert the visible reflectance to an appropriate brightness scale that is based on the eye's sensitivity to the different wavelengths of light. The resultant "brightness" value is called the "photopic reflectance". The term "reflectance" as used herein refers to photopic reflectance unless otherwise noted. The phenomena of eye sensitivity to light and photopic reflectance is described in detail in "Color: Essence and Logic" by Rolf G. Kuehni, 1983, Van Nostrand Reinhold Company Inc. which is hereby incorporated by reference.

The thickness of a given layer in the multilayered antireflecting coating of the present invention may be defined in terms of its physical thickness. However, specifying the various layers by their physical thickness is not particularly useful because such measurements do not account for varying indices of refraction. A more useful measurement is optical thickness. For purposes of the present invention, optical thickness is defined as the physical thickness of a layer multiplied by its refractive index divided by a selected wavelength. For example, for a ⅓ wavelength optically thick layer for a coating exposed to light having a 550 nanometers ("nm") wavelength, the various physical thickness and index of refraction to meet the ⅓ wavelength requirement can be determined from the following equation.

$$1/3 = \frac{\text{physical thickness of the coating} \times \text{index of refraction of the coating}}{550 \text{ nm}}$$

TCO/Low Refractive Index Two-Layer Antireflective Coating

Figure 1:
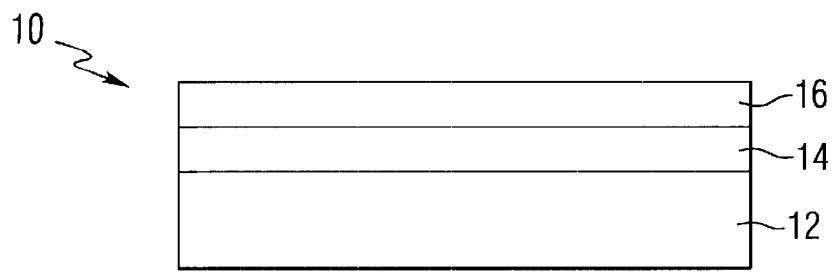
FIG. 1 is a cross-sectional view of a substrate having an antireflective coating in accordance with the present invention deposited thereon.

Referring to FIG. 1 there is shown a cross-sectional view of a coated article 10 including a substrate 12 having a TCO layer 14 deposited over a surface of the substrate and a low refractive index layer 16 deposited over the TCO layer 14. The term "low refractive index layer" means that the index of refraction of the top layer (in this discussion the layer 16) is less than the index of refraction of the underlying layer (in this discussion the layer 14). As may be appreciated, it is not required that the layer 16 have a uniform index of refraction throughout its thickness, in fact the index of refraction of the layer 16 may vary with the depth of the low refractive index layer provided the average index of Although not limited to the invention, the layer 14 may have an index of refraction less than about 1.6 preferably below 1.5. The TCO layer 14 may be indium tin oxide, fluorine-doped zinc oxide, zinc stannate, antimony-doped tin oxide, phosphorous-doped tin oxide, indium oxide, zinc oxide, cadmium stannate, arsenic-doped tin oxide, thallium-doped tin oxide, tellurium-doped tin oxide, tungsten-doped tin oxide, titanium-doped indium oxide, antimony-doped indium oxide, lead-doped indium oxide, fluorine-doped indium oxide, indium-doped zinc oxide, aluminum-doped zinc oxide, gallium indium oxide, cadmium indium oxide, or preferably fluorine-doped tin oxide. This group of materials is meant to be demonstrative of materials that may be used in the practice of the invention; however, the invention is not limited to these materials.

The low refractive index layer 16 may be a silicon-containing material, alumina, cryolyte, magnesium fluoride, an organic polymer, or an inorganic hybrid polymer; however, the invention is not limited thereto. The low refractive index layer 16 may include silica in an inorganic form, in an organic polymer form or in any combination of these two forms. Further, there may be interdispersed in the low refractive index layer 16 other elements or compounds to improve the durability, adhesion and/or chemical resistance of the low refractive index layer 16. To further improve the antireflective properties of the antireflective coating of the present invention, the low refractive index layer 16 may also include a compositional gradient which provides the low refractive index layer 16 with a refractive index gradient or may have a roughened or textured surface farthest from the substrate. In a refractive index gradient, the refractive index in that section of the low refractive index layer 16 immediately below the roughened surface, matches the refractive index of the bulk portion of the low refractive index layer 16. As the distance from the bulk of the index layer 16 toward the outer surface of the index layer 16, the low refractive index layer 16 decreases through the roughened section becomes a mixture of bulk material and void or empty space. The refractive index decreases as the ratio of void to bulk material increases thereby creating a refractive index gradient.

The substrate of the present invention is not limiting to the invention and may include glass, plastic, metal or wood. Preferably, in the practice of the invention, the materials are transparent and have a relatively low index of refraction, e.g., by less than 1.8.

Where it is desired that the TCO layer 14 exhibits antistatic and/or electromagnetic {"EMR") shielding, the TCO layer 14, preferably, has electrical properties (e.g., electrical conductivity). For example, the sheet resistance of the layer preferably is less than about 1000 ohm/square. For improved EMR shielding, a sheet resistance of less than 500 or 250 ohms/square is recommended and for optimum EMR shielding, sheet resistance of 100 ohms/square or even as low as 20 ohms/square or less is recommended. As can now be appreciated by those skilled in the art, the sheet resistance value can be obtained in any usual manner, e.g., by combinations of electron or hole carrier concentration, carrier mobility or thickness. By way of illustration and not limiting to the invention, fluorine-doped tin oxide has a sheet resistance of about 100 ohms/square at a thickness of about 1000 angstroms, a carrier concentration of about $7 \times 10^2$ electrons/cm$^3$ and a mobility of 5 cm$^2$/volt-second. The sheet resistance is determined from the following equation, $$\text{ohms/square} = 6.24 \times 10^{26}/(n)(mu)(d),$$

where:
"n" is the carrier concentration of the material of the layer in carriers/cm$^3$;
"mu" is the electron mobility of the material of the layer in cm$^2$/volt second, and
"d" is the thickness of the layer in Angstroms (Å).

The absorption of light by TCO layers in the visible spectrum can be increased or decreased depending on the layer thickness, mobility, the carrier concentration of the material of the layer and dopant, if present, in the material. Where a dopant is present in the TCO layer, it can also affect the TCO's absorption of light. The visible absorption of light may be varied within the range of about 0.05% to greater than 60%. Some samples of combinations of carrier concentration, mobility and thickness for fluorine-doped tin oxide layer that provide less than 1000 ohms/square sheet resistance are listed in Table 1 below.

TABLE 1

| Sample # | (1) Bulk Thickness Å | (2) Roughness Thickness Å | (3) Hall Mob. Average muH | (4) Average Carr. Conc. * e20 | (5) Sheet Resistance ohms/cm2 |
|---|---|---|---|---|---|
| 1 | 435 | 154 | 6.53 | 5.53 | 403.8 |
| 2 | 623 | 70 | 8.75 | 5.18 | 227.7 |
| 3 | 871 | 226 | 8.15 | 7.61 | 169.0 |
| 4 | 927 | 178 | 10.94 | 6.13 | 111.8 |
| 5 | 622 | 70 | 9.75 | 3.16 | 228.7 |
| 6 | 1097 | 174 | 10.06 | 6.93 | 100.0 |

TABLE 1-continued

| Sample # | (1) Bulk Thickness Å | (2) Roughness Thickness Å | (3) Hall Mob. Average muH | (4) Average Carr. Conc. * e20 | (5) Sheet Resistance ohms/cm2 |
|---|---|---|---|---|---|
| 7 | 975 | 131 | 8.78 | 5.75 | 131.9 |
| 8 | 1386 | 210 | 13.88 | 6.73 | 62.4 |
| 9 | 1338 | 216 | 13.49 | 5.11 | 70.7 |
| 10 | 1606 | 184 | 13.58 | 5.60 | 63.4 |
| 11 | 957 | 199 | 12.10 | 3.97 | 96.8 |
| 12 | 1451 | 155 | 15.38 | 4.75 | 60.6 |
| 13 | 1672 | 236 | 15.38 | 5.95 | 46.0 |
| 14 | 1313 | 251 | 13.94 | 3.57 | 69.7 |
| 15 | 2113 | 271 | 18.50 | 6.02 | 33.9 |
| 16 | 1966 | 187 | 15.26 | 5.26 | 41.0 |
| 17 | 1634 | 228 | 15.62 | 4.01 | 48.5 |
| 18 | 2090 | 308 | 19.20 | 4.34 | 37.0 |
| 19 | 2206 | 227 | 15.30 | 6.35 | 33.4 |
| 20 | 2553 | 376 | 20.53 | 4.59 | 27.3 |
| 21 | 2798 | 349 | 20.11 | 4.88 | 24.0 |
| 22 | 3323 | 379 | 20.76 | 5.37 | 20.0 |
| 23 | 3002 | 268 | 18.85 | 4.34 | 24.1 |
| 24 | 3381 | 474 | 23.75 | 4.47 | 18.4 |
| 25 | 3880 | 497 | 22.61 | 4.82 | 16.0 |
| 26 | 4100 | 497 | 22.40 | 4.87 | 14.3 |
| 27 | 5032 | 587 | 24.57 | 4.76 | 11.1 |

In Table 1 column 1 is the bulk thickness of the coating and column 2 is the thickness of the surface roughness; the volume for columns 1 and 2 were each determined by variable angle spectroscopic ellipsometry. The combined thickness of columns 2 and 3 is the physical film thickness. Column 3 is the Hall mobility of the free electrons in the film, column 4 is the free electron carrier concentration in the TCO layer and column 6 is the sheet resistance of the TCO layer.

The surface of the TCO layer farthest from the substrate can be roughened in any convenient manner on an atomic scale with peak to valley roughness on the order of about 0 to 80% of the total thickness of the film or layer. This roughened area can improve the bonding between the TCO layer 14 and the low refractive index layer 16. Additional materials may be placed between the TCO layer 14 and the low refractive index layer 16 to further improve the bonding between the two layers. These additional layers may have refractive indices different than either the TCO layer 14 and the low refractive index layer 16. The sheet resistance of the TCO layer may be reduced by applying a primer or barrier layer to the substrate to prevent ion impurity migration into the TCO layer. This is particularly important when the substrate is soda lime glass which may be subject to substantial sodium ion migration from the substrate into coatings deposited thereover. The barrier layer also will suppress the formation of pits and holes in the coating thereby improving the optical and electrical properties. Barrier layers of the type disclosed in U.S. Pat. No. 5,830,252 may be used in the practice of the inventor. The disclosure of U.S. Pat. No. 5,830,252 is hereby incorporated by reference.

The two layer coating composition discussed above provides excellent anti-static and EMR properties by the presence of the TCO layer 14 with sheet resistance less than about 1000 ohms/square. The combination of a low refractive index layer 16 on top of a TCO layer 14 creates an antireflective coating that reduces the reflectance from the surface of the substrate 12 by as much as 90–95% of the reflection from the substrate without the antireflective coating of the present invention.

⅓–⅕ Two Layer Antireflective Coating

Figure 2:
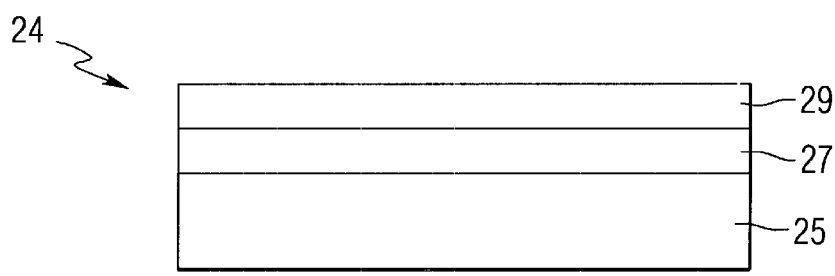
FIG. 2 is a cross-sectional view of a substrate having antireflective coating of the present invention having a layer having ⅓ wavelength optical thickness deposited over a substrate and a second layer having a ⅕ wavelength over the optical thickness layer.

Coated article having a layer having a ⅓ wavelength optical thickness and a ⅕ wavelength optical thickness (hereinafter "⅓–⅕ two layer antireflective coating" or "⅓–⅕ wavelength design") of the present invention includes a first layer having a refractive index between about 1.6 and 2.4 and about a ⁵⁄₁₆–⁷⁄₁₆ optical thickness at the selected wavelength, and a second layer having a refractive index less than about 1.65 and less than ¼ and preferably about ¹⁄₆₀ to ⅕ optical thickness at the selected wavelength. With reference to FIG. 2, there is shown a coated article 24 substrate 25 having a first layer 27 deposited over the substrate 25 and a second layer 29 deposited over the first layer. This combination produces anti-reflection at the selected wavelength, but importantly, also reduces the reflectance over most of the visible wavelength region and is superior over coated articles having two layers each having a ¼ wavelength optical thickness (hereinafter "¼–¼ wavelength antireflective coatings" or "¼–¼ wavelength design").

Figure 3:
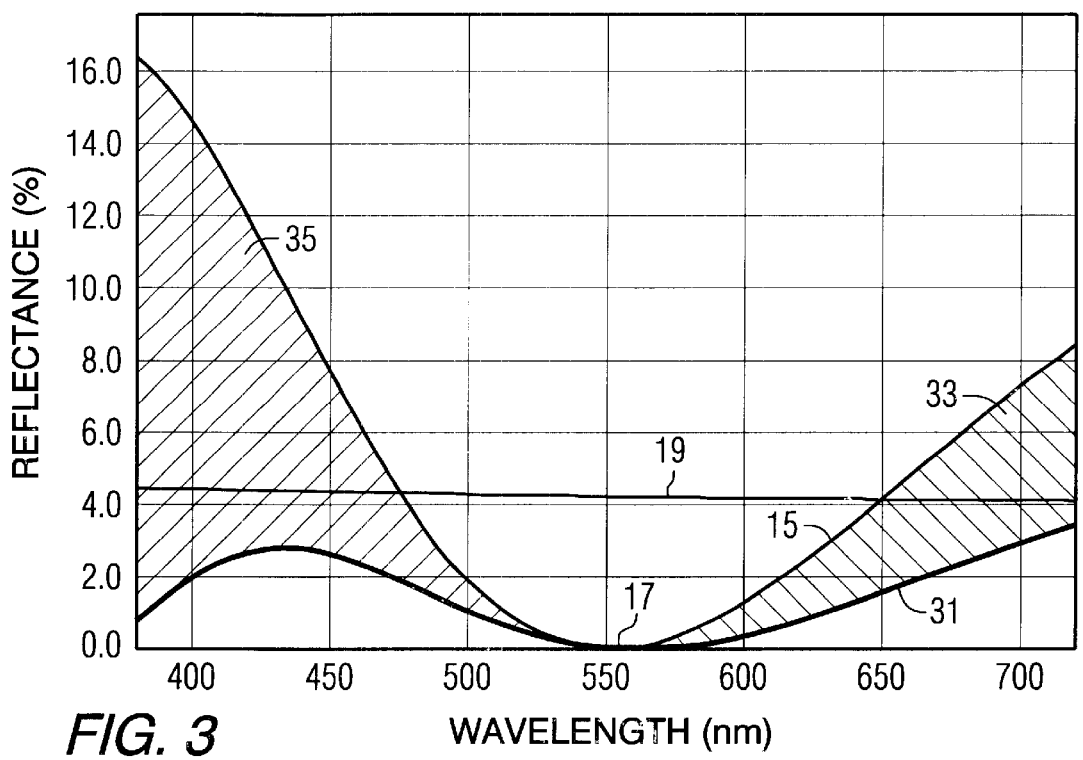
FIG. 3 is a plot of reflectance in percent versus wavelength demonstrating certain advantages of antireflective coating of the present invention shown in FIG. 2 over a presently available antireflective coating.

FIG. 3 shows a comparison between reflectance curve 15 of presently available ¼–¼ wavelength antireflection coating, and the reflectance curve 31 for the ⅓–⅕ wavelength antireflective coating of the instant invention. The reflectance curve 19 for the uncoated glass substrate is also shown in FIG. 3 for comparison. While both coatings obtain complete or nearly complete anti-reflection at the selected wavelength of about 550 nm as illustrated at point 17 on the plot of FIG. 3, reflectance curve 31 has a reflectance that is less than that of reflectance curve 15 through most of the visible spectrum as illustrated by the shaded areas 33 and 35 in FIG. 3. Reflectance curve 31 was generated using a TCO layer with a refractive index of 1.95 and a silica second layer, however the photopic reflectance of reflectance curve 31 is less than 0.50%, which is about a 66% improvement over the ¼–¼ wavelength design.

Figure 4:
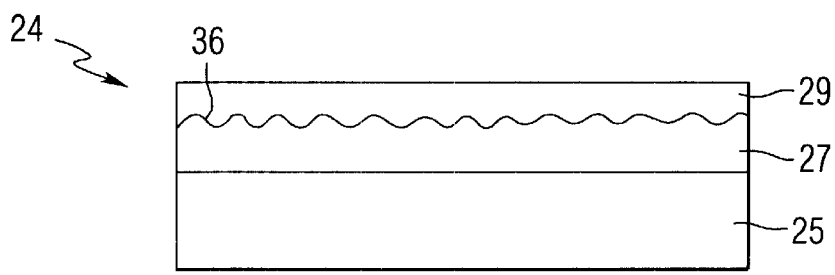
FIG. 4 is a cross-sectional view of a substrate illustrating a roughened interface incorporating features of the invention between the layers.

In an alternative embodiment of the present invention as illustrated in FIG. 4, a surface of the first layer 27 deposited over the substrate 25. The interface 37 between the first layer 27 and the second layer 29 is roughened as illustrated by wavelength designated by numeral 36 ("roughened zone") to create a refractive index different from the refractive indices of the first layer 27 and the second layer 29. The roughened zone 36 improves the bonding between the two layers 27 and 29 and provides a different refractive index zone or a gradient refractive index zone median for the two layers 27 and 29 that does not appreciably affect the performance of the antireflective coating of the present invention. Typically, the roughed zone 36 is between greater than 0% and 80% of the total thickness of the layer 27. The performance of the antireflective coating is not compromised by a thin roughened gradient refractive index zone interposed either between the substrate 25 and the first layer 27 and/or between the second layer 29 and the incident medium shown in FIG. 5 as roughened zone 39.

The ⅓–⅕ wavelength antireflective coating of the instant invention has been described for anti-reflecting light incident to the surface of the substrate 25 at 0° or normal incidence. As may be appreciated by those skilled in the art, the optical thicknesses of the layers 27 and 29 may be adjusted to anti-reflect light impinging upon the surface of the substrate at different angles of incidence. As the incident angle of the light impinging upon the substrate 25 from the perpendicular to the oblique, the effective optical thickness of the antireflective coating decreases and the physical thickness of the layers must be increased to compensate for this effect. For example, where the thicknesses of a normal-incidence-designed antireflective coating are about 1060 Å and 778 Å respectively, for a first layer 27 including a fluorine-doped tin oxide over which is deposited a second silica-containing second layer 29, respectively, a coating designed for about a 30° incidence angle will require that the thicknesses for the first layer 27 is about 1092 Å while the thickness of the second layer 29 is about 832 Å; an antireflective coating designed for about a 45° incidence angle will require a thickness for the first tin oxide layer of about 1103 Å and a thickness for the second silica containing layer of about 913 Å.

Nominal ⅓–⅕ Wavelength Two-Layer Three-Zone Anti-Reflection Coating

Figure 5:
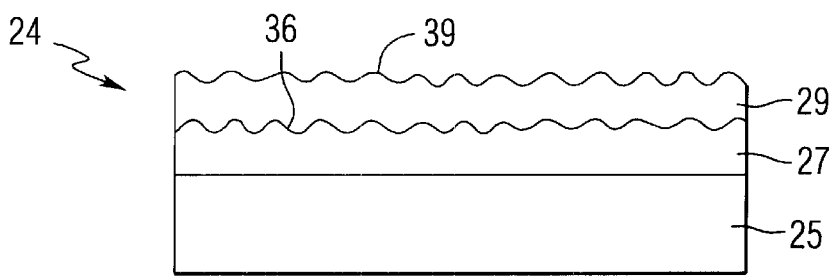
FIG. 5 is a cross-sectional view illustrating roughening of the top layer in accordance to the teachings of the invention at its interface with air as incident medium above the substrate.

As may be appreciated, when the antireflective coatings are used in a visual application (e.g. viewing a transmitted image through the antireflective coating), the lower the reflectance over the broadest wavelength region the more effective the antireflective design. It has been found with the present invention that a broad band antireflective coating can be obtained by a modification of the two-layer antireflective coatings described above. The modification is to etch or otherwise modify the second layer such that there are voids present in a portion of the second layer, more particularly present in the outermost substrate of the second layer e.g. surface 39 shown in FIG. 5. The voids provide a graded refractive index as described above. The above-described first layer/second layer with roughened zones provides a three refractive index system which includes two fixed index zones, and one graded index zone. FIG. 5 is a cross-sectional view of the two-layer, three-zone antireflective coating. The antireflective coating is over substrate 25 and includes a first layer 27 deposited over the substrate 25, and a second layer 29 deposited over the first layer. A portion of the second layer 29 is etched to provide a roughened zone 39. Optionally, and as illustrated in FIG. 5, the first layer 27 may also be etched to provide a roughened zone 37.

Figure 6:
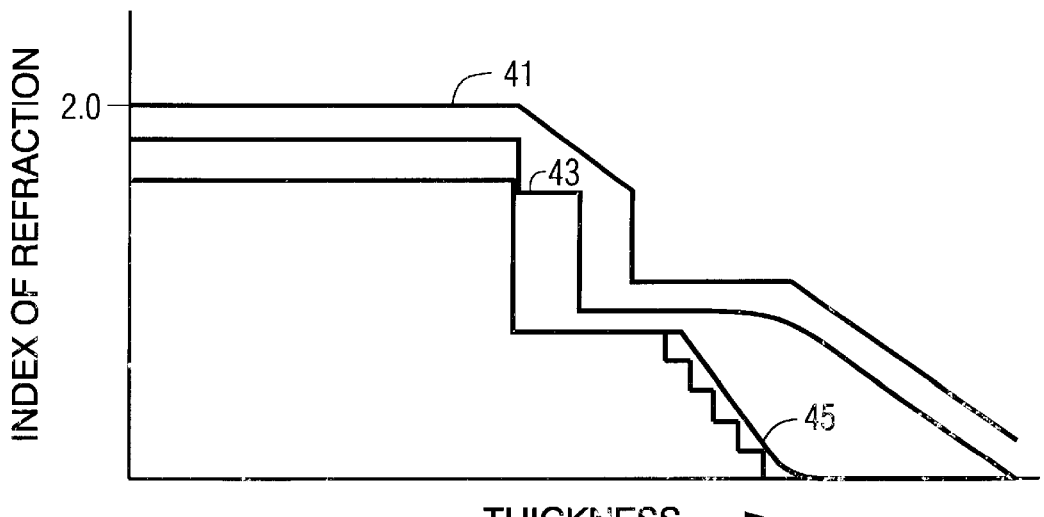
FIG. 6 is a plot showing refractive index versus film thickness for various refractive index profiles in accordance to the teachings of the invention.

Depending on the manufacturing process, the antireflective coating illustrated in FIG. 5 could have any of several refractive index profiles as depicted, but not limited to, those in FIG. 6. FIG. 6 is a plot of the refractive index versus thickness for several potential refractive index profiles of the antireflective coating of FIG. 5. The horizontal axis is the thickness of the film and the vertical axis is the refractive index. Curve 41 corresponds to an antireflective coating consisting of a first TCO layer 27 with a roughened (e.g. as deposited rough surface or a surface mechanically worked to make it rough) or etched surface 37 to provide a graded index zone and a second low index layer 29 with a roughened or etched surface 39 to provide a second graded index. Curve 43 of FIG. 6 is similar to curve 41 except that the first TCO layer 27 is thinner and the roughened surface 37 zone results in a fixed index zone instead of a graded index zone.

Figure 7:
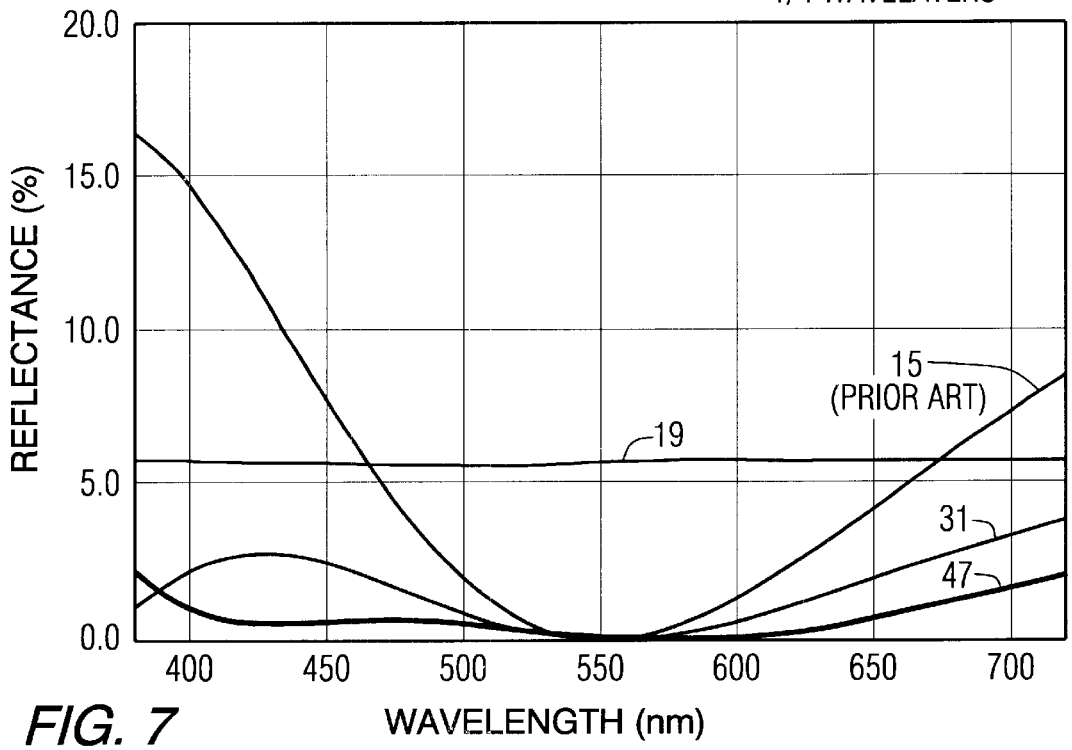
FIG. 7 is a plot of reflectance in percent versus wavelength for substrates having different antireflective coatings.

Curve 45 of FIG. 6 corresponds to an antireflective coating which includes a first TCO layer 27 without a roughened surface over which is deposited a second low index layer 29 that has a surface roughness 39 which is formulated to provide a series of step functions. The resultant curve of the step functions is designated by numeral 45 in FIG. 6 and shown as resultant reflectance curve 47 in FIG. 7. FIG. 7 is a plot of the reflectance in percent versus wavelength comparing: 1) the presently available ¼–¼ antireflective coating described above, curve 15; 2) the above described two-layer antireflective coating, curve 31; 3) the uncoated substrate, curve 19; and 4) a two-layer, three-zone antireflective coating, curve 47 consisting of a first TCO layer over which is deposited a second low refractive index layer, the second layer having a roughened surface which provides a step index surface graded index zone. As can be seen from FIG. 7, the antireflective coating, curve 47, provides a better antireflectance over a broader wavelength band than the antireflective coating, curve 31, of the present invention, and over a significantly broader wavelength band than the presently available ¼–¼ antireflective coating, curve 15. From the foregoing it is clear that the present invention provides a lower reflectance over a broader wavelength range.

As can be appreciated, the optical and physical properties of the first layer with a second layer having a roughened surface is the same as a first layer used with a second layer without a roughened surface. The thickness of the second low index layer is preferably increased in this embodiment of the present invention (second layer having a roughened surface) to about ¼ to ⅓ optical thickness to provide broad band anti-reflection performance. An increase in the thickness of the layers with increased angle of incidence is the same as described above. The presence of thin zones or layers having different refractive indices between the first and second layers is acceptable without appreciably affecting the anti-reflection performance.

Four-Layer Antireflective Coatings

The ability of the antireflective coating to provide EMR shielding is directly related to the conductivity of the antireflective coating. As mentioned above, the antireflective coating is preferably a broad band antireflective coating for optimum reflectance reduction. The various embodiments mentioned above provide adequate antireflectance and EMR shielding, but there are limitations in the above-described embodiments that may restrict optimizing the coating to certain electrical resistivity requirements while maintaining excellent broad band anti-reflection performance. What is desired is an anti-reflection design that provides good photopic light reduction, is a broad band antireflective coating and is one that can provide a variety of electrical conductivities for various applications. The electrical behavior of the coating, as described previously, is related to the carrier concentration, the mobility and the thickness of the coating. In practice, there are limitations on the carrier concentration and mobility that can be obtained, which cannot be improved beyond certain limits. Therefore, the film thickness is preferably modified to further reduce the sheet resistivity and conversely increase electrical conductivity.

Figure 8:
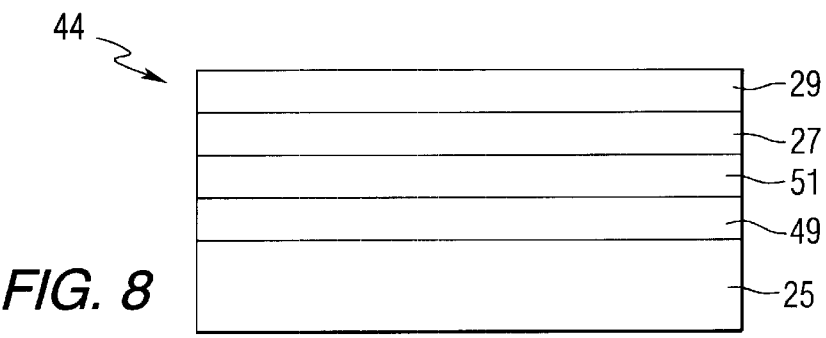
FIG. 8 is a cross-sectional view of a 4-layer antireflective coating of the present invention deposited on a substrate.

The ⅓–⅕ layer combination and the ⅓–⅕ roughened surfaces combination discussed above can be modified to meet the requirement of a variable conductive layer by the addition of at least a pair of layers between the first layer and the substrate. FIG. 8 is a cross-sectional view of an article 44 having a four-layer antireflective coating of the present invention on substrate 25. The antireflective coating is supported over the substrate 25 and includes a first layer 49 deposited over the substrate 25, a second layer 51 deposited over the first layer 49 thereover, in turn having a third layer 27 deposited over the second layer 51 has a fourth layer 29 deposited over the third layer 27. The first layer 49 is a high index layer relative to the substrate and the second layer 51 is a low index layer relative to the first layer 49. The third layer 27 may have any arbitrary thickness due to the unique properties of the two additional layers 51 and 49 between the third layer 27 and the substrate 25. The optical thickness of each of the layers 49 and 51 is less than ⅛ optical thickness and the sum of the two layers 49 and 51 is less than ⅕ optical thickness. The thickness of the third layer 27 can be of any thickness and may even be zero thickness, i.e., not present at all and yet excellent antireflective properties are realized. The thickness of the third layer 27 may range from 0 to greater than 3000 Å and preferably is 50 Å to 3000 Å. Preferably, the fourth layer 29 when a homogeneous layer is approximately ¼ optical thickness and when other than a homogeneous {"non-homogeneous"} layer is between about ¼ and ½ optical thickness.

The refractive index of the second layer 51 is less than the refractive index of third layer 27 and is preferably less than about 1.7 and most preferably less than about 1.5. The refractive index of the first layer 49 is greater than the refractive index of the second layer 51, is preferably higher than about 1.6 and most preferably higher than about 1.8. In an alternative embodiment of the present invention, each of the layers in the above-described antireflective coating may be provided with a roughened surface that assists in the bonding between the layers. The combination of the roughened surfaces with the layers 49 and 51 demonstrates that the antireflective performance is not compromised by the presence of layers having intermediate or different refractive index from the major layers 27 and 29 in the antireflective coating.

The usefulness of the graded index zone in the layer 29 previously discussed extends beyond the antireflective coatings of the instant invention. Virtually any antireflection coating can be improved by including a graded or non-homogeneous index zone in the antireflective coating. The graded index zone is preferably positioned in the multilayered coating next to the incident medium. By way of illustration, a standard three-layer antireflective coating of the ¼–½–¼ wavelength configuration, with a third layer being silica deposited over the second layer, a second layer of fluorine-doped tin oxide deposited on a first layer having a refractive index of about 1.69 deposited over a substrate. The above-described coating has a reflectance of about 0.62. This same design, all layers staying constant except for providing the silica layer with a graded index zone has a reflectance of about 0.13 which is about an 80% reduction from the antireflective coating which does not include the graded index zones. Antireflective coatings using fixed index layers require destructive interference generated at interfaces between layers to achieve anti-reflection, while graded index zones eliminate such interfaces to achieve anti-reflection. The combination of eliminating or grading an interface in combination with destructive interference from interfaces provides unexpected superior anti-reflection properties.

The optical thicknesses for the 4-layer antireflective coatings described above are based on normal incidence optimization and, as discussed previously, must be increased when the antireflective coating is to be used for non-normal incidence applications.

Antireflective Coatings Employing Moderately Absorbing Materials

The visible light transmission of certain substrates, more particularly glass substrates, is often adjusted for enhanced contrast for different applications. This often requires a special production run to make the glass for each different visible light transmission level required or desired. The cost of manufacturing and inventory for the glass can be reduced if glass with only one transmission level is produced and the visible light transmission is reduced by another method. An antireflective coating that will permit adjustment of the visible light transmitted is possible by incorporating moderately absorbing materials in the antireflective coating construction. A moderately absorbing material is hereby defined as a material that has an imaginary refractive index, k, between about 0.05 and 0.8.

The use of highly absorbing materials (k>1.0) is described in U.S. Pat. No. 5,407,733 and "Anti-static Anti-reflection Coatings Using Various Metal Layers", J. Wolfe, 38th Annual Technical Conference Proceedings of the Society of Vacuum Coaters, Apr. 2–7, 1995. The highly absorbing materials described in these publications must be very thin and maintained precisely to moderate the visible light transmission in a controllable way. The high k values limit the thickness of the coatings to only a few nanometers in thickness and multiple layers are necessary to achieve adequate anti-reflection performance. The tight thickness tolerances on these materials and the need for complex designs for anti-reflection properties makes the coatings difficult to manufacture and expensive.

The need for complex anti-reflection designs and the stringent thickness tolerances of anti-reflection coatings using highly absorbing materials is circumvented in the practice of he invention by using moderately absorbing materials in the antireflective coatings of the instant invention. The lower k values of moderately absorbing materials versus highly absorbing materials allow for thicker layers to be used in antireflective coatings for a given transmission target. The performance of the resultant antireflective coating is usually less sensitive to changes in the thickness of the moderately absorbing layer versus the highly absorbing layer, which translates into higher production yields. The ability to use thicker layers allows for greater flexibility in creating an antireflective coating that meets the requirements of the application. The highly absorbing layers are preferably very thin to meet the transmission requirements and to attain the desired reflectance with the thin layers requires the use of many additional layers to get the desired antireflection performance. This translates into additional costs in manufacturing the more complex designs.

Figure 9:
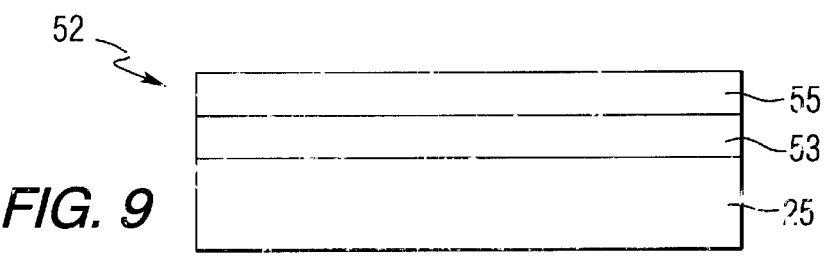
FIG. 9 is a cross-sectional view of a 2-layer antireflective coating of the present invention deposited on a substrate.

Two-layer antireflective coatings with a moderately absorbing first layer deposited over the substrate and a second layer having an index of refraction lower than the first layer deposited thereover will have excellent antireflection properties, and depending on the thickness of the first layer and its k value will have a transmission level between about 10% to about 90%. In FIG. 9 there is shown article 52 having a two-layer antireflective coating incorporating moderately absorbing materials. The antireflective coating is supported on substrate 25 and includes a first layer 53 that is a moderately absorbing layer deposited over the substrate and a second layer 55 over the layer 53 that is a low index layer. The antireflection performance in the form of lower integrated reflectance and broad band characteristics can be further enhanced by adding additional layers either between the moderately absorbing layer 53 and the substrate 25 or between the moderately absorbing layer 53 and the second layer 55. The additional layers may have substantial absorption on their own, may be conductive or may be relatively non-absorbing.

Figure 10:
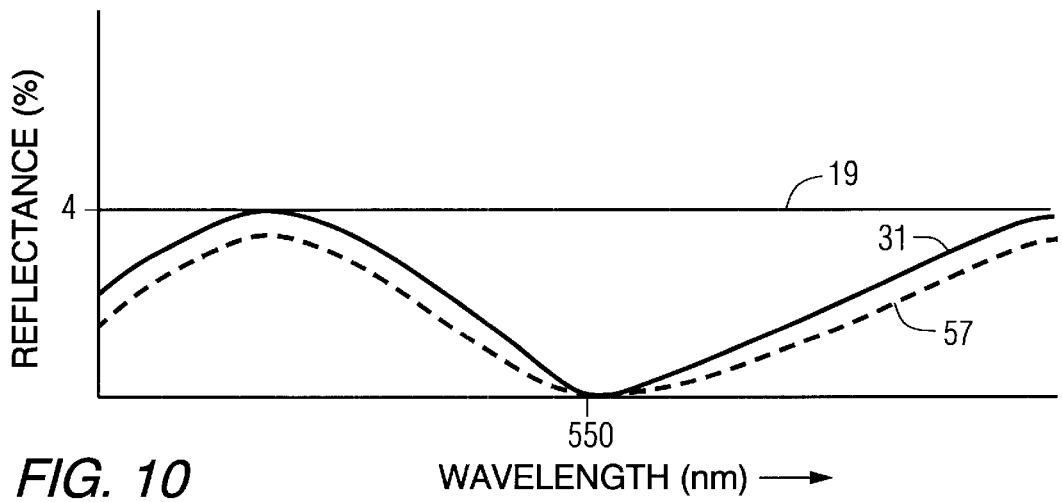
FIG. 10 is a plot of reflectance in percent versus wavelength for the coated substrate shown in FIG. 9.

The optical constants of tin oxide with two dopant levels of antimony were used in the practice of the invention. The samples were prepared by pyrolytically spraying butyltintrichloride with antimony trichloride added. The antimony trichloride was added in 2 and 4 weight percent levels in the precursor solution. The imaginary refractive index was about 0.08 and 0.13 at 5300 Å wavelength for the 2 and 4 weight percent solutions, respectively. The antimony-doped tin oxide was then used in antireflective coatings. FIG. 10 shows the advantage that moderate absorption gives to the two-layer design described previously. The reflectance versus wavelength is plotted for an uncoated substrate 19, for the two-layer design of the instant invention, curve 31 and for a two-layer design using a moderately absorbing material, curve 57. The moderately absorbing material is antimony-doped tin oxide with an imaging refractive index of about 0.13 at 5300 Angstroms wavelength. The moderate absorption materials can also be used in antireflective coatings which employ a graded index layer such as those described previously.

Materials that are suitable moderately absorbing layers are chromium oxide, manganese oxide, cobalt oxide, iron oxide, copper oxide or vanadium oxide. These materials can be used separately or in mixtures with other absorbing oxides or in mixtures with other oxides such as tin oxide, germanium oxide, titanium oxide, aluminum oxide, zirconium oxide, zinc oxide, indium oxide, cadmium oxide, hafnium oxide, tungsten oxide, vanadium oxide, molybdenum oxide, iridium oxide, nickel oxide, tantalum oxide, strontium oxide, lead oxide, scandium oxide, gallium oxide, arsenic oxide, yittrium oxide, antimony oxide or bismuth oxide. In addition to the absorption properties of the pure materials, the mixtures of oxides may also generate absorption centers by chromophors, charge transfer or other mechanisms. In addition to oxides, other materials that may be moderately absorbing are nitrides, silicides, sulfides, borides, carbides or mixtures therein.

The deposition of the TCO layers, moderately absorbing layers or low index layers may be accomplished by chemical vapor deposition CVD, combustion CVD, plasma assisted CVD, remote plasma assisted CVD, laser assisted CVD, remote plasma assisted aerosol deposition, pyrolytic spray or other technique. The low index layer may also be applied by sol gel, sputter coating or other technique. For example, the sol-gel mixture may be applied by dip or spin methods to the surface to be coated and then cured at temperatures between about 140° C. and about 500° C. for between 1 to 60 minutes or for sufficient time for the sol-gel solvent to evaporate and the composition to form its specific properties.

Further as can be appreciated by those skilled in the art, the coatings of the instant invention may be used in the manufacture of any article where the resultant article has an anti-reflective surface, anti-static surface, an antireflective surface having moderately absorbing materials or combinations thereof. Such articles include but are not limited to CRTs, flat panel, eye glasses, automotive transparencies, photo copier plates, metal articles, and electromagnetic shields to name a few.

The present invention will be further understood from the descriptions of specific examples which follow.

EXAMPLE 1

The reflectance from a substrate is reduced by the application of the composition of matter of the instant invention. The substrate is clear float glass and the TCO layer is fluorine-doped tin oxide. The tin oxide layer is applied by the chemical vapor deposition technique and the low index layer is applied by the sol gel technique.

The TCO is applied to the glass during the forming process on a conventional float line (see U.S. Pat. No. 4,853,257). The precursor for the fluorine-doped tin oxide is monobutyltintrichloride (MBTC), the precursor for the fluorine is trifluoroacetic acid (TFA) and water is used as an accelerant. The concentration of the MBTC, TFA and water are varied to produce different thicknesses of the TCO with varying electrical properties as demonstrated in Table 2 below. The low index layer was a sol-gel deposition applied to the TCO layer at room temperature and subsequently heated to 200° C. to cure the sol gel layer. The index of the sol gel layer is expected to be about 1.45.

The initial reflectance of the clear glass is about 8%, approximately 4% from each side of the glass. The two layer coating of the instant invention is applied to only one side of the glass so the minimum reflectance that can be obtained is about 4% for a perfect reflection elimination. The thickness of the TCOs, the thickness of the roughness zones between the TCO and the low index zone and the thickness of the low index portions are listed in Table 2. The thicknesses of the TCO and the roughness zone were determined by variable angle spectroscopic ellipsometry and are accurate to about ±10 Å for the roughness zone and about ±10% for the bulk thickness. The thickness of the low index zones were estimated from reflectance data and are accurate to ±50 Å.

The reflectance for the substrate with the composition of matter of the instant invention is reduced from about 8% to a minimum of about 4.5% and in every case the reflectance is below the initial 8% level.

versus wavelength for this coating stack. The photopic reflectance for this design is greater than 1.00%, and the average reflectance is greater than 5% (see FIG. 11).

EXAMPLE 3

The improvements over ¼–¼ wavelength design by the ⅓–⅕ wavelength design of the instant invention are demonstrated in this example. The optical constants of a fluorine-doped tin oxide were determined as a function of wavelength in the visible spectrum using a variable angle spectroscopic ellipsometer and are listed in Table 3.

TABLE 2

| Sample # | TCO Bulk Thickness Å | Roughness Thickness Å | Hall Mob. Average muH | Average Carr. Conc. * e20 | Sheet Resistance ohms/cm2 | Sol Gel Thickness Å | Reflectance percent |
|---|---|---|---|---|---|---|---|
| BB1 | 435 | 154 | 6.53 | 5.53 | 403.8 | 850 | 6.35 |
| BB2 | 623 | 70* | 8.75 | 5.1 | 227.7 | 730 | 6.65 |
| BB3 | 871 | 226 | 8.15 | 7.61 | 169 | 680 | 5.21 |
| BB4 | 927 | 178 | 10.94 | 6.13 | 111.8 | 660 | 5.00 |
| BB5 | 622 | 70* | 9.75 | 3.16 | 228.7 | 800 | 6.06 |
| BB6 | 1097 | 174 | 10.06 | 6.93 | 100 | 720 | 4.45 |
| BB7 | 975 | 131 | 8.78 | 5.75 | 131.9 | 680 | 4.61 |
| BB8 | 1386 | 210 | 13.88 | 6.73 | 62.4 | 560 | 5.89 |
| BB9 | 1338 | 216 | 13.49 | 5.11 | 70.7 | 560 | 5.04 |
| BB10 | 1606 | 184 | 13.58 | 5.6 | 63.4 | 850 | 5.34 |
| BB11 | 957 | 199 | 12.1 | 3.97 | 96.8 | 690 | 4.69 |
| BB12 | 1451 | 155 | 15.38 | 4.75 | 60.6 | 560 | 5.95 |
| BB13 | 1672 | 236 | 15.38 | 5.95 | 46 | 850 | 5.67 |
| BB14 | 1313 | 251 | 13.94 | 3.57 | 69.7 | 500 | 5.64 |
| BB15 | 2113 | 271 | 18.5 | 6.02 | 33.9 | 600 | 7.53 |
| BB16 | 1966 | 187 | 15.26 | 5.26 | 41 | 800 | 5.47 |
| BB17 | 1634 | 228 | 15.62 | 4.01 | 48.5 | 850 | 5.62 |
| BB18 | 2090 | 308 | 19.2 | 4.34 | 37 | 650 | 6.33 |
| BB19 | 2206 | 227 | 15.3 | 6.35 | 33.4 | 680 | 6.56 |
| BB20 | 2553 | 376 | 20.53 | 4.59 | 27.3 | 600 | 6.31 |
| BB21 | 2798 | 349 | 20.11 | 4.88 | 24 | 500 | 6.06 |
| BB22 | 3323 | 379 | 20.76 | 5.37 | 20 | 660 | 6.48 |
| BB23 | 3002 | 268 | 18.85 | 4.34 | 24.1 | 750 | 4.76 |
| BB24 | 3381 | 474 | 23.75 | 4.47 | 18.4 | 600 | 6.83 |
| BB25 | 3880 | 497 | 22.61 | 4.82 | 16 | 660 | 5.87 |
| BB26 | 4100 | 497 | 22.4 | 4.87 | 14.3 | 600 | 5.45 |
| BB27 | 5032 | 587 | 24.57 | 4.76 | 11.1 | 600 | 6.26 |

EXAMPLE 2

Comparative Example

Figure 11:
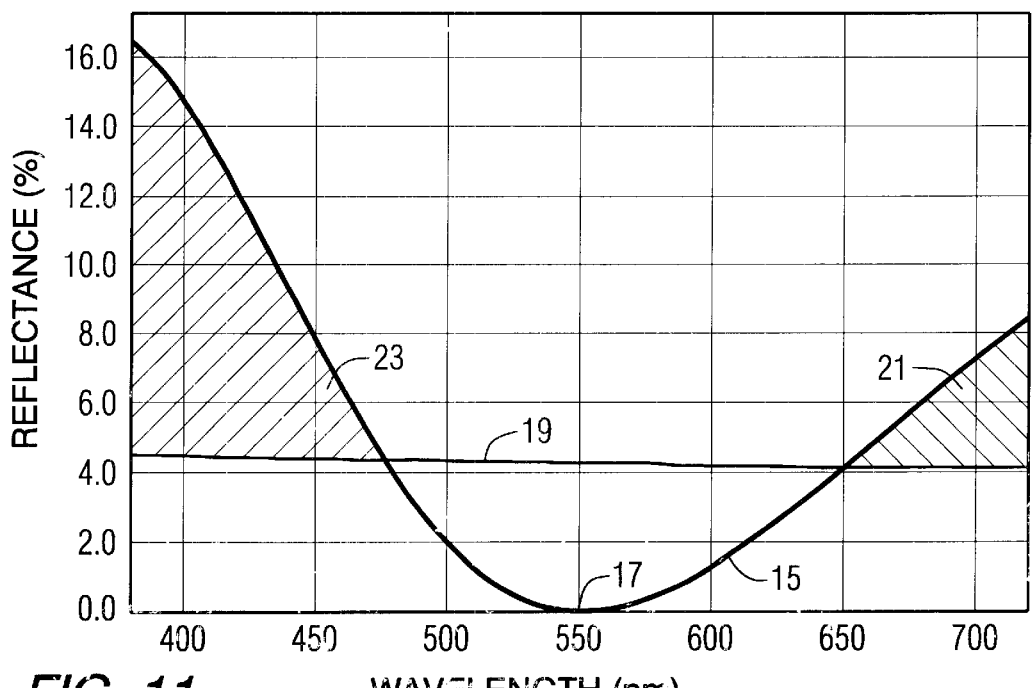
FIG. 11 is a plot of reflectance in percent versus wavelength of presently available antireflective coatings having one layer with a ¼ wavelength optical thickness and the other layer with a ¼ wavelength optical thickness deposited over a glass substrate.
Figure 12:
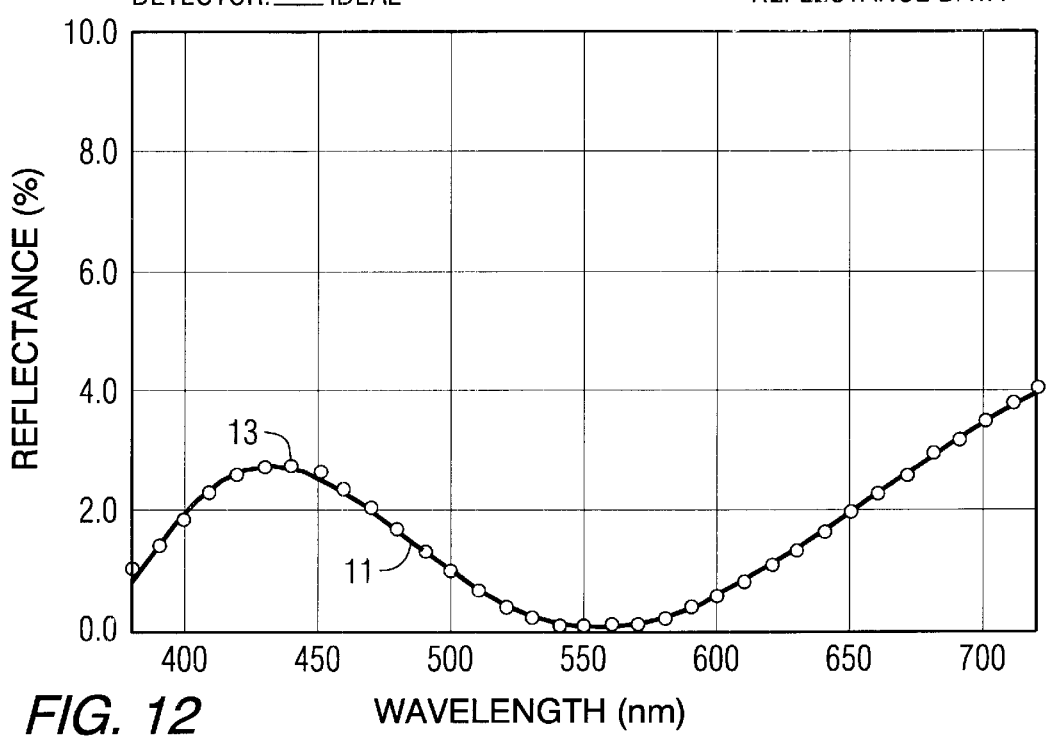
FIG. 12 is a computer generated graph showing reflectance in percent versus wavelength.

This example demonstrates the two-layer anti-reflection coating. The refractive index of the TCO layer is about 2.1 in the visible portion of light. The human eye is most sensitive to 550 nm light so a quarter wave of TCO would have a physical thickness of 655 Å at this wavelength. The refractive index of the top layer of the ¼–¼ wavelength design is calculated from the following formula: refractive index of layer 2 is equal to the square root of the refractive index of layer 1 squared times the index of refraction of the incident medium divided by the index of refraction of the substrate. The refractive index of layer two is 1.71 for layer 1, the refractive index is 2.1, the refractive index for glass is 1.51 and the refractive index of incident medium 1.0. The physical thickness of layer 2 is 804 Å for a ¼ wave optical thickness at 550 nm. FIG. 11 is a graph generated using a commercial computer program to calculate the reflectance

TABLE 3

| Wavelength | Real Index of Refraction (n) | Imaginary Index of Refraction (k) |
|---|---|---|
| 380 | 2.005 | 0.019 |
| 390 | 1.994 | 0.017 |
| 400 | 1.984 | 0.016 |
| 410 | 1.975 | 0.015 |
| 420 | 1.967 | 0.014 |
| 430 | 1.959 | 0.014 |
| 440 | 1.951 | 0.013 |
| 450 | 1.940 | 0.012 |
| 460 | 1.936 | 0.011 |
| 470 | 1.931 | 0.011 |
| 480 | 1.926 | 0.010 |
| 490 | 1.921 | 0.010 |
| 500 | 1.916 | 0.011 |
| 510 | 1.911 | 0.011 |
| 520 | 1.906 | 0.012 |
| 530 | 1.900 | 0.013 |

TABLE 3-continued

| Wavelength | Real Index of Refraction (n) | Imaginary Index of Refraction (k) |
|---|---|---|
| 540 | 1.894 | 0.013 |
| 550 | 1.888 | 0.013 |
| 560 | 1.882 | 0.014 |
| 570 | 1.875 | 0.014 |
| 580 | 1.869 | 0.014 |
| 590 | 1.863 | 0.014 |
| 600 | 1.857 | 0.014 |
| 610 | 1.851 | 0.014 |
| 620 | 1.846 | 0.015 |
| 630 | 1.840 | 0.015 |

TABLE 3-continued

| Wavelength | Real Index of Refraction (n) | Imaginary Index of Refraction (k) |
|---|---|---|
| 640 | 1.834 | 0.015 |
| 650 | 1.829 | 0.016 |
| 660 | 1.822 | 0.017 |
| 670 | 1.816 | 0.017 |
| 680 | 1.809 | 0.017 |
| 690 | 1.803 | 0.018 |
| 700 | 1.796 | 0.018 |
| 710 | 1.789 | 0.019 |
| 720 | 1.782 | 0.021 |

The physical thickness of the fluorine-doped tin oxide layer is 1060 Å for an approximate 1/3 optical thickness at a design wavelength of 550 nm using the above-discussed relationship for optical thickness. The second layer is a silica layer with a refractive index of 1.45 and a physical thickness of 778 Å for a 1/5 optical thickness at a design wavelength of 550 nm. The reflectance as a function of wavelength is calculated using a commercial thin film software package and is shown in FIG. 5 curve 31. The photopic reflectance is 0.44% and the average reflectance is 1.5%. Comparing this to the 1/4–1/4 wavelength design described in Example 2, the photopic reflectance is reduced by over 50% and the average reflectance is reduced by about 70%.

EXAMPLE 4

The 1/3–1/5 anti-reflection design of the instant invention has utility in applications where TCOs and their index restrictions do not occur. Table 4 is a list of anti-reflection designs that partially demonstrate the scope of the instant invention. The reflectance values listed in Table 4 were calculated using a commercial thin film program. Column 1 lists the thickness of layer 2, column 2 lists the refractive index of layer 2, column 3 lists the thickness of layer 1, column 4 lists the refractive index of layer 1, column 5 lists the optical thickness of layer 2, column 6 lists the optical thickness of layer 1 and column 7 lists the photopic reflectance for the designs. Row 15 is a 1/4–1/4 wavelength design showing the high photopic reflectance.

TABLE 4

| Row | (1) Layer 2 THICKNESS | (2) Layer 2 RI | (3) Layer 1 THICKNESS | (4) Layer 1 RI | (5) Layer 2 Optical Thickness | (6) Layer 1 Optical Thickness | (7) Photopic Reflectance |
|---|---|---|---|---|---|---|---|
| 1 | 976 | 1.30 | 1151 | 1.63 | 3/13 | 1/3 | 0.13 |
| 2 | 873 | 1.35 | 1231 | 1.74 | 3/14 | 7/18 | 0.19 |
| 3 | 883 | 1.40 | 995 | 1.75 | 9/40 | 6/19 | 0.30 |
| 4 | 845 | 1.40 | 1093 | 1.75 | 3/14 | 8/23 | 0.29 |
| 5 | 823 | 1.40 | 1088 | 1.80 | 4/19 | 5/14 | 0.32 |
| 6 | 788 | 1.40 | 1125 | 1.85 | 1/5 | 3/8 | 0.35 |
| 7 | 745 | 1.40 | 1143 | 1.95 | 4/21 | 2/5 | 0.43 |
| 8 | 750 | 1.45 | 1106 | 1.95 | 1/5 | 9/23 | 0.45 |
| 9 | 732 | 1.50 | 1004 | 1.95 | 1/5 | 5/14 | 0.57 |
| 10 | 764 | 1.55 | 897 | 1.95 | 3/14 | 7/22 | 0.64 |
| 11 | 661 | 1.60 | 936 | 2.10 | 5/26 | 5/14 | 0.87 |
| 12 | 694 | 1.40 | 1091 | 2.20 | 3/17 | 7/16 | 0.76 |
| 13 | 616 | 1.60 | 957 | 2.20 | 7/39 | 5/13 | 1.00 |
| 14 | 619 | 1.65 | 913 | 2.20 | 5/27 | 4/11 | 1.06 |
| 15 | 948.3 | 1.45 | 705.1 | 1.95 | 1/4 | 1/4 | 1.34 |

EXAMPLE 5

The thicknesses of the layers in the antireflection coatings of the instant invention are preferably increased when the coating is to be used at non-normal incidence. The optimum thicknesses for a normal incidence application for a 1/3–1/5 wavelength design using fluorine-doped tin oxide and silica are 1060 Å and 778 Å, respectively. When the design is optimized for 30° from normal incidence the thicknesses are 1093 Å and 832 Å for the fluorine-doped tin oxide and the silica, respectively. When the design is optimized for 45° from normal incidence the thicknesses are 1103 Å and 913 Å for the fluorine-doped tin oxide and the silica, respectively. The foregoing discussion regarding the 1/3–1/5 wavelength design is applicable to other coating stacks of the instant invention.

EXAMPLE 6

The 1/3–1/5 wavelength design is useable at other design wavelengths other than 550 nm. Table 5 below lists the physical and optical thicknesses for anti-reflection coatings optimized to eliminate the reflection at the design wavelengths. The refractive indices of the layers at the design wavelengths and the optical thicknesses are also listed.

TABLE 5

|  | Samples | | | | | | |
| --- | --- | --- | --- | --- | --- | --- | --- |
|  | 1 | 2 | 3 | 4 | 5 | 6 | 7 |
| Design Wavelength | 400 nm | 450 nm | 500 nm | 550 nm | 600 nm | 650 nm | 700 nm |
| Layer 1 Physical Thickness | 525 Å | 605 Å | 682 Å | 765 Å | 859 Å | 962 Å | 1095 Å |
| Layer 2 Physical Thickness | 764 Å | 857 Å | 950 Å | 1035 Å | 1106 Å | 1156 Å | 1154 Å |
| Glass Substrate Thickness | 1.0 mm | 1.0 mm | 1.0 mm | 1.0 mm | 1.0 mm | 1.0 mm | 1.0 mm |
| Layer 2 RI | 1.467 | 1.463 | 1.459 | 1.455 | 1.452 | 1.45 | 1.446 |
| Layer 1 RI | 1.984 | 1.94 | 1.916 | 1.888 | 1.857 | 1.829 | 1.796 |
| Layer 2 Optical Thickness | 0.19 | 0.20 | 0.20 | 0.20 | 0.21 | 0.21 | 0.23 |
| Layer 1 Optical Thickness | 0.38 | 0.37 | 0.36 | 0.36 | 0.34 | 0.33 | 0.30 |

EXAMPLE 7

Computer models of two-layer, three-zone anti-reflections designs were generated to further demonstrate the scope of the invention. A commercial thin film computer program was used to calculate the reflectance of the designs. The computer program is designed to handle only fixed index layers so the graded layer is simulated by five layers of discrete 10 refractive index. In these designs the bulk of layer one is a low index material with a refractive index of 1.45. The refractive indices of the five layers that simulate the graded layer are 1.375, 1.30, 1.225, 1.15 and 1.075 with the 1.375 layer next to the bulk and the 1.075 layer next to the incident medium. The thicknesses of the layers and the resultant reflectance are listed in Table 6 below. In Table 6 the term Grade refers to Layer. These designs are present to illustrate the invention and are not limiting thereto.

TABLE 6

| Design Stack | Physical Thickness | Refractive Index | Optical Thickness |
| --- | --- | --- | --- |
| Case 1 | | | |
| Glass | 1.0 mm | 1.51 | — |
| F:SnO2 | 1233 Å | 1.888 | 0.42 |
| SiO2 | 313 Å | 1.45 | 0.08 |
| Grade 1 | 154 Å | 1.375 | 0.04 |
| Grade 2 | 200 Å | 1.3 | 0.05 |
| Grade 3 | 200 Å | 1.225 | 0.04 |
| Grade 4 | 200 Å | 1.15 | 0.04 |
| Grade 5 | 200 Å | 1.075 | 0.04 |
| Layer 1 Cumulative | 1267 Å | | 0.29 |
| Photopic Reflectance | | | 0.14 |
| Case 2 | | | |
| Glass | 1.0 mm | 1.51 | — |
| F:SnO2 | 1181 Å | 1.888 | 0.41 |
| SiO2 | 370 Å | 1.45 | 0.10 |
| Grade 1 | 170 Å | 1.375 | 0.04 |
| Grade 2 | 170 Å | 1.3 | 0.04 |
| Grade 3 | 170 Å | 1.225 | 0.04 |
| Grade 4 | 170 Å | 1.15 | 0.04 |
| Grade 5 | 170 Å | 1.075 | 0.03 |
| Layer 1 Cumulative | 1220 Å | | 0.29 |
| Photopic Reflectance | | | 0.24 |
| Case 3 | | | |
| Glass | 1.0 mm | 1.51 | — |
| F:SnO2 | 1156 Å | 1.888 | 0.40 |
| SiO2 | 411 Å | 1.45 | 0.11 |
| Grade 1 | 150 Å | 1.375 | 0.04 |
| Grade 2 | 150 Å | 1.3 | 0.04 |
| Grade 3 | 150 Å | 1.225 | 0.03 |
| Grade 4 | 150 Å | 1.15 | 0.03 |
| Grade 5 | 150 Å | 1.075 | 0.03 |
| Layer 1 Cumulative | 1161 Å | | 0.28 |
| Photopic Reflectance | | | 0.26 |
| Case 4 | | | |
| Glass | 1.0 mm | 1.51 | — |
| F:SnO2 | 1159 Å | 1.888 | 0.40 |
| SiO2 | 464 Å | 1.45 | 0.12 |
| Grade 1 | 130 Å | 1.375 | 0.03 |
| Grade 2 | 130 Å | 1.3 | 0.03 |
| Grade 3 | 130 Å | 1.225 | 0.03 |
| Grade 4 | 130 Å | 1.15 | 0.03 |
| Grade 5 | 130 Å | 1.075 | 0.03 |
| Layer 1 Cumulative | 1114 Å | | 0.27 |
| Photopic Reflectance | | | 0.30 |
| Case 5 | | | |
| Glass | 1.0 mm | 1.51 | — |
| F:SnO2 | 1228 Å | 1.888 | 0.42 |
| SiO2 | 295 Å | 1.45 | 0.08 |
| Grade 1 | 200 Å | 1.375 | 0.05 |
| Grade 2 | 200 Å | 1.3 | 0.05 |
| Grade 3 | 200 Å | 1.225 | 0.04 |
| Grade 4 | 200 Å | 1.15 | 0.04 |
| Grade 5 | 200 Å | 1.075 | 0.04 |
| Layer 1 Cumulative | 1295 Å | | 0.30 |
| Photopic Reflectance | | | 0.20 |
| Case 6 | | | |
| Glass | 1.0 mm | 1.51 | — |
| F:SnO2 | 1310 Å | 1.888 | 0.45 |
| SiO2 | 335 Å | 1.45 | 0.09 |
| Grade 1 | 200 Å | 1.375 | 0.05 |
| Grade 2 | 200 Å | 1.3 | 0.05 |
| Grade 3 | 200 Å | 1.225 | 0.04 |
| Grade 4 | 200 Å | 1.15 | 0.04 |
| Grade 5 | 200 Å | 1.075 | 0.04 |
| Layer 1 Cumulative | 1335 Å | | 0.31 |
| Photopic Reflectance | | | 0.29 |
| Case 7 | | | |
| Glass | 1.0 mm | 1.51 | — |
| High Index | 1163 Å | 1.684 | 0.36 |
| SiO2 | 377 Å | 1.45 | 0.10 |
| Grade 1 | 200 Å | 1.375 | 0.05 |
| Grade 2 | 200 Å | 1.3 | 0.05 |
| Grade 3 | 200 Å | 1.225 | 0.04 |
| Grade 4 | 200 Å | 1.15 | 0.04 |
| Grade 6 | 200 Å | 1.075 | 0.04 |
| Layer 1 Cumulative | 1377 Å | | 0.32 |
| Photopic Reflectance | | | 0.14 |
| Case 8 | | | |
| Glass | 1.0 mm | 1.51 | — |
| High Index | 1176 Å | 1.706 | 0.36 |
| SiO2 | 328 Å | 1.45 | 0.09 |
| Grade 1 | 200 Å | 1.375 | 0.05 |
| Grade 2 | 200 Å | 1.3 | 0.05 |
| Grade 3 | 200 Å | 1.225 | 0.04 |
| Grade 4 | 200 Å | 1.15 | 0.04 |
| Grade 5 | 200 Å | 1.075 | 0.04 |
| Layer 1 Cumulative | 1328 Å | | 0.31 |
| Photopic Reflectance | | | 0.12 |

EXAMPLE 8

The utility of the 4-layer design of the instant invention is demonstrated in the following cases. The 4-layer design is unique in that the thickness of the second layer can be arbitrarily selected, for example to provide varying levels of EMI shielding, while maintaining excellent anti-reflection properties. The optical constants of the tin oxide coating are the same as those listed in Example 3 above. The low index layers are silica with a refractive index of 1.45. The photopic reflectance is calculated using a commercial thin film computer program and listed in Table 7. The thickness of layer 1, fluorine-doped tin oxide, ranges from a ⅛ optical thickness to a full wave optical thickness at 550 nm.

absorbing layer of the invention as part of the anti-reflection design. In this example the layer over the substrate is replaced by antimony-doped tin oxide with an imaginary refractive index of 0.121 at 500 nm wavelength. FIG. 10 shows the improvement obtained using moderately absorbing materials in the standard 2-layer design of the instant invention. Curve 31 is a curve of the 2 layer having fluorine doped tin oxide from Example 3. Curve 57 is the two layer design of this Example 10. The reflectance is 0.30, compared to 0.45 for the same design using fluorine-doped tin oxide, a 33% improvement.

EXAMPLE 11

Computer modeling of various 2-layer designs using moderately absorbing materials was conducted to demon-

TABLE 7

| | Samples | | | | | | | | | | | | | |
|---|---|---|---|---|---|---|---|---|---|---|---|---|---|---|
| | 7-1 | 7-2 | 7-3 | 7-4 | 7-5 | 7-6 | 7-7 | 7-8 | 7-9 | 7-10 | 7-11 | 7-12 | 7-13 | 7-14 |
| Layer 4 Physical Thickness | 960 Å | 960 Å | 930 Å | 870 Å | 830 Å | 830 Å | 890 Å | 930 Å | 950 Å | 930 Å | 910 Å | 900 Å | 900 Å | 930 Å |
| Layer 3 Physical Thickness | 360 Å | 550 Å | 730 Å | 910 Å | 1090 Å | 1270 Å | 1460 Å | 1640 Å | 1820 Å | 2000 Å | 2190 Å | 2370 Å | 2730 Å | 3100 Å |
| Layer 2 Physical Thickness | 210 Å | 260 Å | 270 Å | 240 Å | 310 Å | 358 Å | 290 Å | 240 Å | 220 Å | 200 Å | 190 Å | 210 Å | 300 Å | 240 Å |
| Layer 1 Physical Thickness | 220 Å | 200 Å | 210 Å | 180 Å | 140 Å | 190 Å | 260 Å | 300 Å | 280 Å | 270 Å | 250 Å | 210 Å | 230 Å | 280 Å |
| Glass Substrate | 1.0 mm | 1.0 mm | 1.0 mm | 1.0 mm | 1.0 mm | 1.0 mm | 1.0 mm | 1.0 mm | 1.0 mm | 1.0 mm | 1.0 mm | 1.0 mm | 1.0 mm | 1.0 mm |
| Layer 4 RI | 1.45 | 1.45 | 1.45 | 1.45 | 1.45 | 1.45 | 1.45 | 1.45 | 1.45 | 1.45 | 1.45 | 1.45 | 1.45 | 1.45 |
| Layer 3 RI | 1.888 | 1.888 | 1.888 | 1.888 | 1.888 | 1.888 | 1.888 | 1.888 | 1.888 | 1.888 | 1.888 | 1.888 | 1.888 | 1.888 |
| Layer 2 RI | 1.45 | 1.45 | 1.45 | 1.45 | 1.45 | 1.45 | 1.45 | 1.45 | 1.45 | 1.45 | 1.45 | 1.45 | 1.45 | 1.45 |
| Layer 1 RI | 1.888 | 1.888 | 1.888 | 1.888 | 1.888 | 1.888 | 1.888 | 1.888 | 1.888 | 1.888 | 1.888 | 1.888 | 1.888 | 1.888 |
| Layer 4 Optical Thickness | 0.25 | 0.25 | 0.25 | 0.23 | 0.22 | 0.22 | 0.23 | 0.25 | 0.25 | 0.25 | 0.24 | 0.24 | 0.24 | 0.25 |
| Layer 3 Optical Thickness | 0.12 | 0.19 | 0.25 | 0.31 | 0.37 | 0.44 | 0.50 | 0.56 | 0.62 | 0.69 | 0.75 | 0.81 | 0.94 | 1.06 |
| Layer 2 Optical Thickness | 0.06 | 0.07 | 0.07 | 0.06 | 0.08 | 0.09 | 0.08 | 0.06 | 0.06 | 0.05 | 0.05 | 0.06 | 0.08 | 0.06 |
| Layer 1 Optical Thickness | 0.08 | 0.07 | 0.07 | 0.06 | 0.05 | 0.07 | 0.09 | 0.10 | 0.10 | 0.09 | 0.09 | 0.07 | 0.08 | 0.10 |
| Photopic Reflectance | 0.44 | 0.34 | 0.28 | 0.28 | 0.34 | 0.5 | 0.61 | 0.59 | 0.54 | 0.48 | 0.44 | 0.44 | 0.47 | 0.57 |

EXAMPLE 9

Computer models were used to demonstrate the functionality of different refractive indices for layers 2 and 1 used in the 4-layer design of the instant invention. Layer 4 is silica and layer 3 is fluorine-doped tin oxide. The thickness of layer 4 is about a quarter wave thickness at a 550 nm design wavelength and layer 3 is an eighth wavelayer. In one case, layer 2 has a refractive index of 1.45 and layer 1 has a refractive index of 2.4. The optical thicknesses of the layers is about a 1/14th and 1/20 wavelayer for layer 2 and 1, respectively. The reflectance from this design is 0.36. In a second case, layer 2 has a refractive index of 1.60 and layer 1 has a refractive index of 2.1. The optical thicknesses of the layers is about a 1/10th and 1/20 wavelayer for layer 2 and 1, respectively. The reflectance from this design is 0.33. In a third case, layer 2 has a refractive index of 1.60 and layer 1 has a refractive index of 2.4. The optical thicknesses of the layers is about a ⅛th and 1/40 wavelayer for layer 2 and 1, respectively. The reflectance from this design is 0.33. These examples are meant to demonstrative and not limiting.

EXAMPLE 10

The reflectance of the two layer ⅓–⅕ wavelength design and other designs is improved with the use of a moderately strate how varied imaginary refractive indices would affect both the reflectivity and the transmissivity of the coated substrates. The substrate in this example is glass and layer 2 is silica. Layer 1 is a moderately absorbing material. The real and imaginary refractive indices of layer 1 are varied to demonstrate how to alter the transmission levels of the coating. The models do not incorporate dispersion in the real and imaginary refractive indices for layer 1. The thickness of layer 2 is selected to optimize the anti-reflection properties. These examples shown in Table 8 are meant to be demonstrative and not limiting to the invention.

TABLE 8

| Sample | Layer 2 Thickness | Layer 1 Thickness | Layer 1 Real RI | Layer 1 Imaginary RI | Photopic Reflectance | Photopic Transmission |
|---|---|---|---|---|---|---|
| 8-1 | 715 | 1073 | 2.1 | 0.05 | 0.51 | 84.0 |
| 8-2 | 715 | 1071 | 2.1 | 0.1 | 0.41 | 74.6 |
| 8-3 | 719 | 1073 | 2.1 | 0.15 | 0.34 | 66.2 |
| 8-4 | 719 | 1078 | 2.1 | 0.2 | 0.28 | 58.6 |
| 8-5 | 762 | 1253 | 2.1 | 0.5 | 0.04 | 23.4 |
| 8-6 | 727 | 1128 | 2.1 | 0.35 | 0.13 | 39.3 |

TABLE 8-continued

| Sample | Layer 2 Thickness | Layer 1 Thickness | Layer 1 Real RI | Layer 1 Imaginary RI | Photopic Reflectance | Photopic Transmission |
|---|---|---|---|---|---|---|
| 8-7 | 762 | 1261 | 2.1 | 0.7 | 0.34 | 13.5 |
| 8-8 | 752 | 1260 | 2.1 | 0.6 | 0.12 | 17.7 |
| 8-9 | 734 | 1257 | 2.1 | 0.8 | 0.68 | 10.4 |
| 8-10 | 685 | 995 | 1.8 | 0.25 | 0.26 | 55.7 |
| 8-11 | 761 | 1067 | 2.3 | 0.25 | 0.2 | 51.5 |
| 8-12 | 812 | 1036 | 2.5 | 0.25 | 0.19 | 51.5 |
| 8-13 | 881 | 976 | 2.8 | 0.25 | 0.23 | 51.8 |
| 8-14 | 677 | 1379 | 1.84 | 0.57 | 0.04 | 15.0 |

EXAMPLE 12

Models using moderately absorbing materials in multi-layer designs are demonstrated in this example based on computer models and listed on Table 9. The substrate is clear glass. The layer first deposited is listed in column (1). Any additional layers are listed to the right of column (1) in columns (2)–(4) and are in order. Graded layers as discussed above are simulated with a single homogeneous layer of fixed refractive index between that of silica and air. This is done to simplify the model and some adjustments in the layer thicknesses must be done when making actual samples to adjust for this approximation. The reflectance and transmission of each design are listed in columns (8) and (9) respectively. The thicknesses, in Angstroms, of the layers are listed beneath the layer material and each new line represents a different thickness combination of the layers. In our simplest case, listed first in the table, the layer next to the substrate is SnO2: Sb, antimony-doped tin oxide, and the first layer, that next to the incident medium, air, is SiO2. Three examples of this design are listed. In the first, the SnO2: Sb layer is 1053 Å thick and the SiO2 layer is 735 Å thick. The reflectance is 0.3 and the transmission is 72.9. These examples are meant to be demonstrate the utility of moderately absorbing materials in anti-reflection designs and their applicability should only be limited by the appended claims.

TABLE 9

| (1) | (2) | (3) | (4) | (5) | (6) | (7) | (8) | (9) |
|---|---|---|---|---|---|---|---|---|
| | | | Structure | | | | Reflectance | Transmission |
| SnO2:Sb | SiO2 | | | | | | | |
| 1053 | 735 | | | | | | 0.3 | 72.9 |
| 2492 | 811 | | | | | | 0.42 | 46.3 |
| 4070 | 854 | | | | | | 0.38 | 28.3 |
| SnO2:Sb | SiO2 | GRADE | | | | | | |
| 1157 | 406 | 481 | | | | | 0.17 | 70.5 |
| 2678 | 507 | 481 | | | | | 0.19 | 43.7 |
| 4287 | 558 | 481 | | | | | 0.13 | 26.5 |
| SnO2:F | SnO2:Sb | SiO2 | | | | | | |
| 784 | 418 | 752 | | | | | 0.39 | 86.4 |
| 2325 | 473 | 820 | | | | | 0.63 | 80.5 |
| 922 | 1709 | 834 | | | | | 0.41 | 57 |
| SnO2:F | SnO2:Sb | SiO2 | GRADE | | | | | |
| 1000 | 257 | 462 | 481 | | | | 0.22 | 89.4 |
| 891 | 406 | 455 | 481 | | | | 0.2 | 86 |
| 2414 | 541 | 540 | 481 | | | | 0.36 | 78.3 |
| 964 | 1916 | 547 | 481 | | | | 0.15 | 53.4 |
| SnO2:Sb | SnO2:F | SiO2 | | | | | | |
| 228 | 2117 | 856 | | | | | 0.64 | 84.4 |
| 531 | 384 | 172 | | | | | 0.3 | 83.3 |
| 1543 | 1008 | 895 | | | | | 0.54 | 59.5 |
| 3092 | 1216 | 934 | | | | | 0.43 | 36.7 |
| 4574 | 1314 | 920 | | | | | 0.4 | 23.3 |
| SnO2:Sb | SnO2:F | SiO2 | GRADE | | | | | |
| 501 | 511 | 423 | 481 | | | | 0.18 | 83.7 |
| SnO2:F | SnO2:Sb | SnO2:F | SiO2 | | | | | |
| 699 | 766 | 1176 | 937 | | | | 0.48 | 72.8 |
| 964 | 769 | 1171 | 937 | | | | 0.48 | 72.8 |
| SnO2:Sb | SnO2:F | SnO2:Sb | SiO2 | | | | | |
| 271 | 1974 | 468 | 832 | | | | 0.4 | 74.2 |
| 249 | 2099 | 365 | 871 | | | | 0.42 | 76.6 |
| SnO2:F | SnO2:Sb | SnO2:F | SnO2:Sb | SiO2 | | | | |
| 1149 | 300 | 1125 | 442 | 838 | | | 0.37 | 73.4 |
| 1084 | 228 | 1104 | 411 | 837 | | | 0.45 | 76.6 |
| 924 | 873 | 658 | 637 | 854 | | | 0.22 | 59.5 |
| SnO2:F | SnO2:Sb | SnO2:F | SnO2:Sb | SiO2 | GRADE | | | |
| 956 | 792 | 580 | 910 | 513 | 481 | | 0.11 | 56.2 |
| SnO2:Sb | SnO2:F | SnO2:Sb | SnO2:F | SnO2:Sb | SiO2 | | | |
| 306 | 824 | 176 | 1075 | 180 | 932 | | 0.44 | 75.5 |

TABLE 9-continued

| (1) | (2) | (3) | (4) | (5) | (6) | (7) | (8) | (9) |
|---|---|---|---|---|---|---|---|---|
| | | | Structure | | | | Reflectance | Transmission |
| SnO2:Sb | SiO2 | SnO2:Sb | SiO2 | | | | | |
| 281 | 163 | 692 | 796 | | | | 0.3 | 73.5 |
| 200 | 291 | 785 | 876 | | | | 0.16 | 72.9 |
| 215 | 205 | 885 | 825 | | | | 0.22 | 70.8 |
| 169 | 226 | 939 | 822 | | | | 0.19 | 70.8 |
| 125 | 218 | 1156 | 779 | | | | 0.41 | 67.1 |
| 228 | 312 | 1121 | 844 | | | | 0.23 | 65 |
| 283 | 302 | 1307 | 838 | | | | 0.32 | 60.2 |
| SnO2:Sb | SiO2 | SnO2:F | Si02 | | | | | |
| 168 | 126 | 786 | 868 | | | | 0.3 | 91.6 |
| 168 | 232 | 787 | 919 | | | | 0.3 | 91.5 |
| 211 | 92 | 674 | 866 | | | | 0.31 | 90.6 |
| 184 | 120 | 738 | 875 | | | | 0.31 | 91.2 |
| 150 | 203 | 821 | 881 | | | | 0.31 | 92 |
| 173 | 203 | 751 | 922 | | | | 0.3 | 91.5 |
| 142 | 217 | 917 | 871 | | | | 0.3 | 92.1 |
| 169 | 142 | 801 | 882 | | | | 0.3 | 91.5 |
| 130 | 222 | 951 | 861 | | | | 0.31 | 92.4 |
| SnO2:Sb | SiO2 | SnO2:Sb | SnO2:F | SiO2 | | | | |
| 204 | 183 | 321 | 415 | 813 | | | 0.51 | 82.7 |
| 162 | 197 | 374 | 498 | 791 | | | 0.59 | 82.3 |
| SnO2:Sb | SiO2 | SnO2:F | SnO2:Sb | SiO2 | | | | |
| 119 | 253 | 1032 | 250 | 842 | | | 0.33 | 85.6 |
| 184 | 177 | 2316 | 518 | 867 | | | 0.19 | 74.6 |
| 242 | 147 | 1929 | 589 | 853 | | | 0.19 | 72.6 |
| 250 | 165 | 3263 | 673 | 845 | | | 0.21 | 67.9 |
| 117 | 284 | 970 | 356 | 829 | | | 0.3 | 83.3 |
| 169 | 291 | 976 | 370 | 830 | | | 0.3 | 66.1 |
| 147 | 184 | 831 | 1750 | 869 | | | 0.29 | 53.9 |
| 167 | 180 | 817 | 1943 | 868 | | | 0.28 | 50.5 |
| 190 | 174 | 861 | 2212 | 867 | | | 0.29 | 46.1 |
| 147 | 154 | 904 | 3239 | 877 | | | 0.3 | 34 |
| 164 | 163 | 2436 | 1595 | 895 | | | 0.33 | 53.5 |
| 179 | 188 | 2369 | 521 | 866 | | | 0.19 | 74.5 |
| 187 | 149 | 629 | 250 | 880 | | | 0.22 | 85 |
| 242 | 149 | 374 | 416 | 860 | | | 0.2 | 80 |
| 284 | 153 | 137 | 655 | 834 | | | 0.2 | 75 |
| 234 | 235 | 20 | 889 | 850 | | | 0.21 | 70 |
| 131 | 214 | 1000 | 1396 | 874 | | | 0.32 | 60 |
| SnO2:F | SiO2 | SnO2:F | SnO2:Sb | SiO2 | | | | |
| 282 | 284 | 219 | 662 | 870 | | | 0.14 | 80.5 |
| 237 | 216 | 2188 | 533 | 857 | | | 0.19 | 79.2 |
| 142 | 284 | 873 | 380 | 817 | | | 0.25 | 86.3 |
| SnO2:Sb | SiO2 | SnO2:F | SnO2:Sb | SiO2 | GRADE | | | |
| 209 | 130 | 2371 | 193 | 602 | 481 | | 0.09 | 81.3 |
| SnO2:F | SiO2 | SnO2:F | SnO2:Sb | SiO2 | GRADE | | | |
| 229 | 203 | 2439 | 160 | 301 | 481 | | 0.1 | 87.8 |
| SnO2:F | SiO2 | SnO2:Sb | SnO2:F | SnO2:Sb | SiO2 | | | |
| 317 | 243 | 175 | 53 | 332 | 852 | | 0.3 | 84.6 |
| 80 | 192 | 367 | 367 | 329 | 819 | | 0.3 | 79.1 |
| 135 | 210 | 158 | 699 | 155 | 840 | | 0.3 | 88 |

EXAMPLE 13

In this Example, roughening the surface of a sol gel layer to reduce percent reflective will be discussed. The roughened surface for purpose of this discussion is considered to be made up of valleys or holes and peaks. The valleys have a depth which is the distance between the lowest point of the valley to the highest peak of the peaks surrounding or forming the valley. As can be appreciated a rough surface is made up of numerous valleys and peaks. The valleys also have a width which is the distance between the peaks surrounding the valley. For the purpose of this discussion, the floor or base of the valley has a surface area. In general the walls of the valley slope toward one another as the distance to the base of the valley decreases. The variables in this discussion are the surface area of the base of the valley, the depth of the valley and the slope of the walls of the valley.

Light beams incident on the rough surface have a portion that moves into the valleys and a portion that is reflected from the peaks. As the depth of the valleys increase with the slope of the walls and surface area of the valleys remaining constant, the percent reflectance from the surface decreases and visa versa. This is due to the light beams entering the valleys and being captured therein. As the surface area of the valleys increase with the slope of the walls and depth of the valleys remaining constant, the reflectance increases. This is due to the valleys opening up and reflected, in other words, less light beams captured in the valleys. As the surface area of the valleys decrease with the slope of the walls and the depth of the valleys remaining constant, the percent reflectance increases because the portion of the light beams enter the valleys decreases. As can be appreciated when the surface area is zero or approaches affinity, the surface is considered smooth. As the slope of the walls sloping toward one another decreases while the surface area and the depth of the valleys remain constant, the percent reflectance decrease and visa versa. The percent reflectance decreases because more light beams are captured in the valleys.

As can now be appreciated there is an optimum depth, surface area and sloping of the walls of the valleys or rough surface that minimizes percent reflectance from the roughened surface. The above can be appreciated from the following discussion.

A layer of sol gel was deposited on a substrate of a monomer sold under PPG Industries, Inc. trademark C-39 and described in U.S. patent application Ser. No. 09/135,907, filed on Aug. 18, 1998 in the name of James P. Colton and Robin Hunt, for "Process for Producing Durable Antireflective Surfaces and Antireflective articles. The sol gel had a thickness of 2 microns and was similar to the sol gel of Example 2 of U.S. Pat. No. 5,580,819 except the tetra functional siloxane (TEOS) was replaced with a metal TEOS. The disclosure of U.S. patent application Ser. No. 09/135,901 and U.S. Pat. No. 5,580,819 are hereby incorporated by reference. A solution of 20 grams of sodium carbonate was dissolved in 52 liters of water. The solution had a pH of 10.0. The pH was increased by increasing the weight of the sodium carbonate and decreased by decreasing the weight of the sodium carbonate. The solution was heated and the sample left in the solution for a given time period. Thereafter, the sample was removed, rinsed and dried. The reflectance of the surface was measured using a Hunter Spectophotometer. Table 10 shows the percent reflectance, solution temperature, pH, and soaking time.

TABLE 10

| Sample | Temperature | Soaking Time (Minutes) | pH | Percent Reflectance |
| --- | --- | --- | --- | --- |
| 10-1 | 100° C. | 8 | 9.5 | 1.55 |
| 10-2 | 100° C. | 10 | 9.5 | 1.70 |
| 10-3 | 90° C. | 10 | 9.5 | 1.55 |
| 10-4 | 90° C. | 12 | 9.5 | 1.55 |
| 10-5 | 100° C. | 8 | 10.0 | 1.65 |
| 10-6 | 100° C. | 8 | 10.6 | 1.85 |

From the information on Table 10, it can be appreciated that the preparation of sample 10-1 is preferred because it has a lower percent reflectance and the shortest soaking time. Sample 10-4 also has a lower percent reflectance but a longer soak time at a lower temperature. The preparation of Sample 10-4 is recommended where processing at a lower temperature is preferred. The percent transmittance of samples 10-1 and 10-4 is expected to be about 98.5%. The percent transmittance of the other samples can be determined by subtracting the percent reflectance from 100%.

As can be appreciated the type of sol gel and etching solution are not limited to the invention; sol gels and solutions of U.S. Pat. No. 5,580,819 may be used in the practice of the invention.

As can now be appreciated, the sol gel may be deposited on any type of substrate, e.g., a glass substrate. Further, the sol gel layer may be deposited over any of the layer(s) deposited on a substrate. By way of example, the two-layer antireflective coating may be deposited on a glass or plastic substrate and sol gel deposited on the coating. The coating may be a tin oxide layer over a graded layer and a sol gel layer over the tin oxide layer. The sol gel layer is roughened as discussed above and a hydrophilic or hydrophobic coating of the type know in the art deposited thereon.

As can now be appreciated, the foregoing discussion and results are presented for purposes of illustrating various embodiments of the invention; however, the invention is not limited thereto. The scope of the invention is defined in the claims.

What is claimed is:

1. An article comprising:
   a substrate;
   a layer defined as a first layer deposited over the substrate, the first layer being a transparent conductive oxide having an index of refraction and having a sheet resistance value of less than about 1000 ohm/square, and
   a layer defined as a second layer deposited over the first layer, the second layer having a refractive index gradient and an index of refraction less than the index of refraction of the first layer.

2. The coated article of claim 1 wherein surface of at least one of the layers is roughened.

3. The coated article of claim 2 wherein a surface of the first layer is roughened.

4. The coated article of claim 2 wherein a surface of the second layer is roughened.

5. The coated article of claim 1 wherein the first layer is an antistatic coating.

6. The coated article of claim 1 wherein the first layer is an electromagnetic shielding.

7. The coated article of claim 1 further including a barrier layer between the substrate and first layer.

8. The coated article of claim 1 wherein the first layer has a varying index of refraction throughout its thickness.

9. The article of claim 8 wherein surfaces of graded layer is roughened.

10. An article comprising:
    a substrate;
    a film defined as a first film deposited over the substrate, the first film having an optical thickness equal to about ⅓ of the wavelength of the light energy whose reflection is to be suppressed defined as the selected wavelength, and
    a film over the first film having an optical thickness equal to about ⅕ of the selected wavelength to provide a coated article having an antireflective coating.

11. The article of claim 10 wherein the surface of at least one of the films is roughened.

12. The article of claim 11 wherein the surface of the first film adjacent the second film is roughened to a depth of between greater than 0 to 80% of the total thickness of the second film.

13. The article of claim 12 wherein the roughened portion of the second film has an index of refraction different from the index of refraction of the remaining portion of the second film.

14. The article of claim 10 wherein one of the films is a transparent conductive oxide.

15. An article comprising:
    a substrate having an index of refraction;
    a first layer deposited over the substrate, the first layer having an index of refraction higher than the index of refraction of the substrate;

a second layer deposited over the first layer, the second layer having an index of refraction lower than the index of refraction of the first layer;

a third layer over the second layer, and a fourth layer over the third layer wherein the optical thickness of the third and fourth layers is each less than ⅛ optical thickness and the sum of the third and fourth layer is less than ⅕ optical thickness.

16. The article of claim 15 wherein one of the layers is a graded layer.

17. The article of claim 15 wherein one of the layers is a transparent conductive oxide.

18. An article comprising:

a substrate;

a first layer having an imaginary index of refraction and an imaginary refraction index between 0.05 and 0.1, and a second layer over the first layer, the second layer having an index of refraction lower than the index of refraction of the first layer.

19. The article of claim 18 wherein one of the layers has a varying index of refraction or the distance from the substrate increases.

20. The article of claim 18 wherein one of the layers is a transparent conductive oxide.

21. An article comprising:

a substrate;

an antireflective layer over the substrate defined as a first layer wherein the first layer has a graded index of refraction;

a second layer over the first layer, the second layer having a different index of refraction than the first layer, and a sol-gel layer over the second layer, the surface of the sol-gel layer has valleys and peaks to reduce surface reflectance.

22. The article of claim 21 wherein the second layer in a transparent conductive oxide.

23. An article comprising:

a substrate;

an antireflective coating over the substrate having at least two layers having a graded index of refraction, and a moderately absorbing material in one of the layers.

24. The article of claim 23 wherein one of the layers is a transparent conductive oxide.

* * * * *